(12) United States Patent
Saito et al.

(10) Patent No.: US 9,368,837 B2
(45) Date of Patent: Jun. 14, 2016

(54) NONAQUEOUS ELECTROLYTE SECONDARY BATTERY, VEHICLE, AND DEVICE USING BATTERY

(75) Inventors: Taira Saito, Miyoshi (JP); Satoru Suzuki, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 750 days.

(21) Appl. No.: 13/613,485

(22) Filed: Sep. 13, 2012

(65) Prior Publication Data

US 2013/0011709 A1 Jan. 10, 2013

Related U.S. Application Data

(63) Continuation of application No. PCT/JP2010/058395, filed on May 18, 2010.

(51) Int. Cl.
*H01M 10/05* (2010.01)
*H01M 10/0587* (2010.01)
*H01M 4/13* (2010.01)
(Continued)

(52) U.S. Cl.
CPC .......... *H01M 10/0587* (2013.01); *H01M 2/263* (2013.01); *H01M 4/13* (2013.01); *H01M 10/052* (2013.01); *H01M 10/4235* (2013.01); *H01M 10/0413* (2013.01); *H01M 10/0436* (2013.01); *H01M 10/0525* (2013.01); *H01M 2200/00* (2013.01); *H01M 2220/20* (2013.01);
(Continued)

(58) Field of Classification Search
CPC ..................... H01M 10/0431; H01M 10/0587; H01M 10/125; H01M 10/286; H01M 6/10; H01M 6/103; H01M 2006/106
See application file for complete search history.

(56) References Cited

U.S. PATENT DOCUMENTS 6,335,114 B1 * 1/2002 Ueshima ............. H01M 2/0285
429/161
2006/0093922 A1 * 5/2006 Kim ....................... C09J 7/0264
429/251

(Continued)

FOREIGN PATENT DOCUMENTS

CN 1838451 9/2006
JP 2001-93583 4/2001

(Continued)

OTHER PUBLICATIONS

International Search Report in International Application No. PCT/JP2010/058395; Mailing Date: Jul. 27, 2010.

*Primary Examiner* — Scott J Chmielecki
(74) *Attorney, Agent, or Firm* — Finnegan, Henderson, Farabow, Garrett & Dunner, LLP

(57) ABSTRACT

Disclosed is a nonaqueous electrolyte secondary battery which comprises a flat wound electrode body wherein a positive electrode plate, which comprises a positive electrode collector foil and a positive electrode active material layer, and a negative electrode plate, which comprises a negative electrode collector foil and a negative electrode active material layer, are wound up with a separator being interposed therebetween. The positive electrode plate has a collector cover layer that has electrical insulation properties and covers at least a part of a facing collector portion in the longitudinal direction in a positive electrode collector portion. The collector cover layer covers at least an innermost semi-cylindrical facing collector portion which forms the innermost part of the facing collector portion and has a half-cylindrical shape.

10 Claims, 21 Drawing Sheets

(51) Int. Cl.
  *H01M 2/26* (2006.01)
  *H01M 10/052* (2010.01)
  *H01M 10/42* (2006.01)
  *H01M 10/04* (2006.01)
  *H01M 10/0525* (2010.01)

(52) U.S. Cl.
  CPC .......... *H01M2220/30* (2013.01); *Y02E 60/122* (2013.01); *Y02T 10/7011* (2013.01)

(56) References Cited

U.S. PATENT DOCUMENTS

| | | | |
|---|---|---|---|
| 2006/0216609 A1* | 9/2006 | Abe | H01M 4/13 429/246 |
| 2006/0222934 A1* | 10/2006 | Min | H01M 2/1673 429/142 |
| 2007/0224493 A1 | 9/2007 | Higuchi et al. | |
| 2010/0086858 A1* | 4/2010 | Kim | H01M 2/16 429/246 |
| 2010/0247991 A1* | 9/2010 | Hosokawa | H01M 2/263 429/94 |
| 2011/0027636 A1* | 2/2011 | Lee | H01M 2/1673 429/94 |

FOREIGN PATENT DOCUMENTS

| | | |
|---|---|---|
| JP | 2002-93404 | 3/2002 |
| JP | 2002-367607 | 12/2002 |
| JP | 2004-241170 | 8/2004 |
| JP | 2006-32112 | 2/2006 |
| JP | 2006-269424 | 10/2006 |
| JP | 2009-37833 | 2/2009 |
| JP | 2009-193842 | 8/2009 |
| WO | WO 2009/128605 | 10/2009 |

* cited by examiner

NONAQUEOUS ELECTROLYTE SECONDARY BATTERY, VEHICLE, AND DEVICE USING BATTERY

CROSS-REFERENCE TO RELATED APPLICATIONS

This application is a continuation application based upon and claims the benefit of the prior PCT International Patent Application No. PCT/JP2010/058395 filed on May 18, 2010, the entire contents of which are incorporated herein by reference.

TECHNICAL FIELD

The present invention relates to a nonaqueous electrolyte secondary battery having a flat wound electrode body formed by winding elongated positive and negative electrode plates with an elongated separator interposed therebetween into a flat shape. The invention also relates to a vehicle and a device using battery having this nonaqueous electrolyte secondary battery mounted thereon.

BACKGROUND ART

Conventionally, secondary batteries with wound electrode bodies formed by winding elongated positive and negative electrode plates with an elongated separator interposed therebetween are known. The positive electrode plate therein is formed by an elongated positive electrode collector foil with a positive electrode active material layer formed in part thereof, and thus includes a longitudinally extending strip-shaped positive electrode portion where the positive electrode active material layer is provided, and a longitudinally extending strip-shaped positive electrode collector portion where the positive electrode active material layer is not provided. The negative electrode plate is formed by an elongated negative electrode collector foil with a negative electrode active material layer formed in part thereof, and thus includes a longitudinally extending strip-shaped negative electrode portion where the negative electrode active material layer is provided, and a longitudinally extending strip-shaped negative electrode collector portion where the negative electrode active material layer is not provided. In a wound electrode body configuration, the positive electrode collector portion of the positive electrode plate protrudes from the separator in a spiral shape on one side in the axial direction thereof, while the negative electrode collector portion of the negative electrode plate protrudes from the separator in a spiral shape on the other side in the axial direction thereof.

It is also known to provide an insulating layer made of resin or the like to the collector portions and others of the positive and negative electrode plates in secondary batteries having the above mentioned configuration. For example, Patent Literatures 1 and 2 mentioned below disclose a secondary battery having such an insulating layer provided therein.

The secondary battery disclosed in Patent Literature 1 includes a cylindrical wound electrode body formed by winding positive and negative electrode plates with a separator interposed therebetween into a cylindrical shape (see FIG. 1 and others of Patent Literature 1). In this secondary battery, a resin coating is applied to the positive and negative electrode plates near the boundary between active material coated portions (positive and negative electrode portions) and exposed portions (positive and negative electrode collector portions) to form strips of insulating layers extending from one end to the other in a longitudinal direction of the positive electrode plate and others (from an innermost end to an outermost end in the cylindrical wound electrode body configuration). It is stated that providing such an insulating layer allegedly covers an edge of the active material layer formed in the active material coated portion adjacent to the exposed portion, whereby this edge of the active material layer can be prevented from coming off of the collector foil, and a short circuit resulting from fallen fragments of the active material layer can be prevented.

The secondary battery disclosed in Patent Literature 2 includes a cylindrical wound electrode body formed by winding positive and negative electrode plates with a separator interposed therebetween into a cylindrical shape (see FIGS. 1, 2, and others of Patent Literature 2). In this secondary battery, insulating resin is coated or an insulating tape is affixed to the positive and negative electrode plates in part of the collector exposed portions (positive and negative collector portions) on the side of the active material coated ends (positive and negative electrode portions) to form strips of insulating layers extending from one end to the other in a longitudinal direction of the positive electrode plate and others (from an innermost end to an outermost end in the cylindrical wound electrode body configuration). It is stated that providing such an insulating layer allegedly reinforces the collector exposed portions whereby deformation thereof caused by vibration or impact can be prevented.

RELATED ART DOCUMENTS

Patent Documents

Patent Document 1: JP 2002-367607A
Patent Document 2: JP 2006-32112A

SUMMARY OF INVENTION

Problems to be Solved by the Invention

In nonaqueous electrolyte secondary batteries with flat wound electrode bodies in which the wound electrode body is not cylindrical as in Patent Literatures 1 and 2 described above but flat, in the positive electrode plate which configures this flat wound electrode body, there is a possibility that the positive active material layer may peel off of the positive electrode collector foil in portions of the positive electrode plate bent into a semi-cylindrical shape (hereinafter referred to also as "semi-cylindrical portion"). In some of a plurality of semi-cylindrical portions, in particular, which are located in the most internal part (hereinafter referred to also as "innermost semi-cylindrical portion") or in semi-cylindrical portions close thereto, the positive electrode active material layer may easily peel off of the positive electrode collector foil because of the large curvature. Peeled fragments of the positive electrode active material layer can move from one side in the axial direction of the flat wound electrode body to various parts of the electrode body through a gap between the positive electrode collector portion and the separator, and such fragments may possibly cause a short circuit in the flat wound electrode body.

Nonaqueous electrolyte secondary batteries with flat wound electrode bodies are generally used in a condition where the batteries (battery cases) are pressed in the thickness direction of the flat wound electrode bodies. Therefore, flat portions between two semi-cylindrical portions of the positive electrode plate (hereinafter referred to also as "flat portion") are each subjected to a pressing force, and portions of the separator facing these flat portions of the positive electrode plate are each retained by this pressing force. Accordingly, heat shrinkage hardly occurs on portions of the separator facing these flat portions of the positive electrode plate even if the flat wound electrode body becomes hot due to the heat generated for example in the last stage of overcharge.

On the other hand, portions of the separator facing the semi-cylindrical portions of the positive electrode plate are almost free of the pressing force mentioned above and not retained, because of which heat shrinkage can easily occur when the flat wound electrode body becomes hot. The innermost ones of the semi-cylindrical portions of the positive electrode plate can become particularly hot, so that particularly large heat shrinkage tends to occur on the portions of the separator facing the innermost semi-cylindrical portions of the positive electrode plate.

On one side in the axial direction of the flat wound electrode body, part of the positive electrode collector portion of the positive electrode plate where the positive electrode active material layer is not present and part of the negative electrode portion of the negative electrode plate where the negative electrode active material layer is present face each other via the separator. Therefore, if large heat shrinkage occurs on the separator in the axial direction in this part, there may be created a portion where there is no separator between the positive electrode collector portion and the negative electrode portion, whereupon the positive electrode collector portion (positive electrode collector foil) and the negative electrode portion (negative electrode active material layer thereof) might be in contact with each other. The positive electrode collector portion, in particular, has a low electrical resistance because of its collector foil being exposed without the positive electrode active material layer. The negative electrode active material layer made of carbon or the like also has a low electrical resistance. Should there be a contact between the positive electrode collector portion (positive electrode collector foil) and the negative electrode portion (negative electrode active material layer) as mentioned above, a large short circuit current will flow and a large amount of heat will be generated, which is not preferable.

The present invention was devised in view of these circumstances, and it is an object of the invention to provide a nonaqueous electrolyte secondary battery with a flat wound electrode body, in which a short circuit in the flat wound electrode body resulting from fragments of the positive electrode active material layer peeled off of the positive electrode collector foil in innermost semi-cylindrical portions of the positive electrode plate is prevented, as well as contact and a short circuit between the positive electrode collector portion included in the innermost semi-cylindrical portion and the negative electrode portion of the negative electrode plate are prevented. Another object is to provide a vehicle having this nonaqueous electrolyte secondary battery mounted thereon and battery powered equipment having this nonaqueous electrolyte secondary battery mounted thereon.

Means of Solving the Problems

To solve the above problems, one aspect of the present invention provides a nonaqueous electrolyte secondary battery including a flat wound electrode body having: an elongated positive electrode plate with a positive electrode active material layer formed in part of an elongated positive electrode collector foil, the positive electrode plate having a longitudinally extending strip-shaped positive electrode portion where the positive electrode active material layer is present in a thickness direction thereof, and a longitudinally extending strip-shaped positive electrode collector portion located at one end in a width direction of the positive electrode plate where the positive electrode active material layer is not present in the thickness direction thereof; an elongated negative electrode plate with a negative electrode active material layer formed in part of an elongated negative electrode collector foil, the negative electrode plate having a longitudinally extending strip-shaped negative electrode portion where the negative electrode active material layer is present in a thickness direction thereof and a longitudinally extending strip-shaped negative electrode collector portion located at one end in a width direction of the negative electrode plate where the negative electrode active material layer is not present in the thickness direction thereof; and an elongated separator, the positive electrode plate and the negative electrode plate being overlapped upon one another via the separator and wound around an axis line into a flat shape. The positive electrode collector portion of the positive electrode plate includes, in the flat wound electrode body configuration, a facing collector portion adjacent to one side in a direction along the axis line of the positive electrode portion and facing the negative electrode portion of the negative electrode plate, and the positive electrode plate includes a collector cover layer having electrical insulation properties and covering a part in the longitudinal direction of the positive electrode collector portion, the collector cover layer covering at least an innermost semi-cylindrical facing collector portion located innermost of the facing collector portion and bent into a semi-cylindrical shape.

In this nonaqueous electrolyte secondary battery, the positive electrode plate forming the flat wound electrode body is provided with a collector cover layer designed to cover at least the innermost semi-cylindrical facing collector portion of the facing collector portion of the positive electrode collector portion. The collector cover layer is arranged between the innermost semi-cylindrical facing collector portion forming the positive electrode collector foil and the separator in the flat wound electrode body configuration, so that a gap between the innermost semi-cylindrical facing collector portions (positive electrode collector foil) and the separator can be eliminated or made small. Therefore, as described above, even if the positive electrode active material layer peels off of the positive electrode collector foil in the innermost semi-cylindrical portion of the positive electrode plate, the peeled fragments of the positive electrode active material layer can be prevented from moving from one side in the axial direction of the flat wound electrode body to various parts thereof through space between the positive electrode collector portion and the separator. Accordingly, in this nonaqueous electrolyte secondary battery, a short circuit in the flat wound electrode body resulting from peeled fragments of positive electrode active material layer can be prevented.

Even if the flat wound electrode body should become hot due to the heat generated for example in the last stage of overcharge, and a portion of the separator facing the innermost semi-cylindrical facing collector portion of the positive electrode plate particularly prone to become hot should undergo large heat shrinkage in the axial direction, the collector cover layer interposed between the innermost semi-cylindrical facing collector portion and the negative electrode portion prevents contact and a short circuit between the innermost semi-cylindrical facing collector portion (positive electrode collector foil) and the negative electrode portion (negative electrode active material layer thereof).

The "collector cover layer" may be made of a material such as resin, rubber, ceramic and the like having electrical insulation properties. The "collector cover layer" may be formed, for example, by coating and drying a paste with an insulating material dispersed therein, or may also be formed by affixing an insulating tape.

In the nonaqueous electrolyte secondary battery described above, the collector cover layer is preferably formed at a location within N/2 turns counted from inside of the flat wound electrode body where N is the number of turns of winding of the positive electrode plate in the flat wound electrode body.

In this nonaqueous electrolyte secondary battery, the collector cover layer is formed at a location within N/2 turns counted from inside of the flat wound electrode body where N is the number of turns of winding of the positive electrode plate in the flat wound electrode body, and not outside the N/2 turns. The collector cover layer is formed only to a limited area in a portion on the inner side, so that an increase in battery weight involved in the formation of the collector cover layer can be restricted. Further, forming the collector cover layer reduces the possibility of electrolyte not permeating well into the flat wound electrode body during manufacture of the battery.

Further, it is preferable to form the collector cover layer in a portion within 3 turns of winding counted from inside of the positive electrode portion.

In any of the nonaqueous electrolyte secondary batteries described above, preferably, the collector cover layer may have a thickness larger than or equal to that of the positive electrode active material layer.

With the thickness of the collector cover layer being made larger than or equal to that of the positive electrode active material layer, the collector cover layer can have close contact with the separator in the flat wound electrode body configuration, leaving no gap between the innermost semi-cylindrical facing collector portion (positive electrode collector foil) and the separator. Therefore, even if the positive electrode active material layer peels off of the positive electrode collector foil in the innermost semi-cylindrical portion of the positive electrode portion, the peeled fragments of the positive electrode active material layer can be more reliably prevented from moving from one side in the axial direction of the flat wound electrode body to various parts thereof through space between the positive electrode collector portion and the separator. Thus a short circuit resulting from the peeled fragments of the positive electrode active material layer can be prevented more reliably.

Also, with the thickness of the collector cover layer being made larger than or equal to that of the positive electrode active material layer, the separator is retained between the collector cover layer and the negative electrode portion of the negative electrode plate. Therefore, even when the flat wound electrode body becomes hot due to the heat generated for example in the last stage of overcharge, heat shrinkage can hardly occur on the separator in this portion. Thus contact and a short circuit between the innermost semi-cylindrical facing collector portion of the positive electrode plate and the negative electrode portion of the negative electrode plate can be prevented more reliably.

Another aspect resides in a vehicle having one of the nonaqueous electrolyte secondary batteries described above mounted thereon and using the electrical energy stored in this nonaqueous electrolyte secondary battery as part or all of the driving energy of the driving source.

In the nonaqueous electrolyte secondary battery described above, a short circuit in the flat wound electrode body resulting from fragments of the positive electrode active material layer peeled off of the positive electrode collector foil in the innermost semi-cylindrical portion of the positive electrode plate is prevented, as well as contact and a short circuit between the positive electrode collector portion included in the innermost semi-cylindrical portion and the negative electrode portion of the negative electrode plate are prevented. Therefore, the vehicle having this lithium ion secondary battery mounted thereon can have higher reliability.

Examples of the "vehicle" include, for example, electric vehicles, hybrid electric vehicles, plug-in hybrid electric vehicles, hybrid railway vehicles, forklifts, electric wheelchairs, electric assist bicycles, electric motor scooters, and the like.

Another aspect resides in battery powered equipment having one of the nonaqueous electrolyte secondary batteries described above mounted thereon and using this nonaqueous electrolyte secondary battery as at least one of the energy sources.

In the nonaqueous electrolyte secondary battery described above, a short circuit in the flat wound electrode body resulting from fragments of the positive electrode active material layer peeled off of the positive electrode collector foil in the innermost semi-cylindrical portion of the positive electrode plate is prevented, as well as contact and a short circuit between the positive electrode collector portion included in the innermost semi-cylindrical portion and the negative electrode portion of the negative electrode plate are prevented. Therefore, the battery powered equipment having this lithium ion secondary battery mounted thereon can have higher reliability.

Examples of "battery powered equipment" include, for example, various battery-driven home appliances, office equipment, and industrial equipment, such as personal computers, mobile phones, battery-driven electric tools, uninterruptible power sources, and the like.

Figure 1:
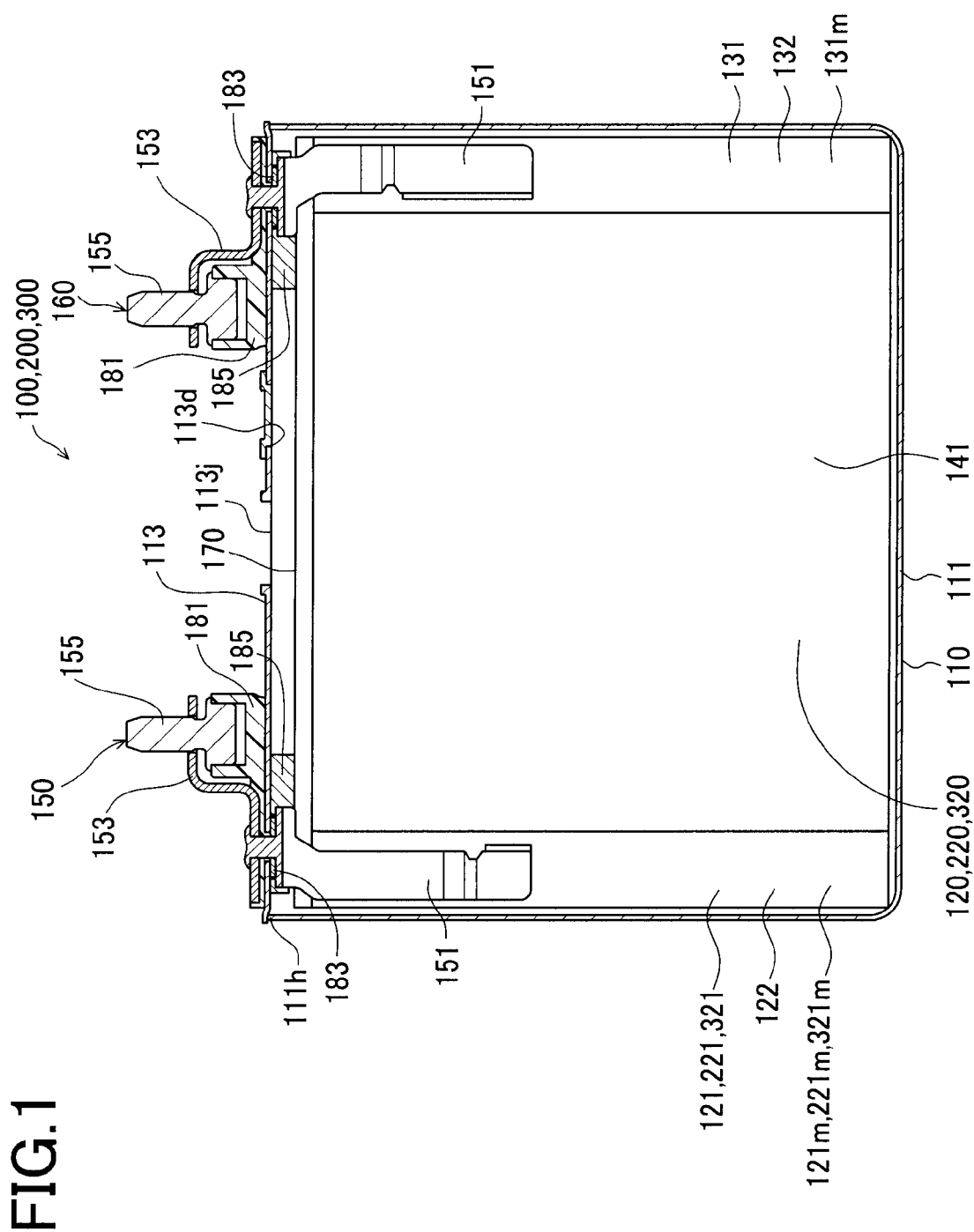
FIG. 1 is a vertical sectional view of a lithium ion secondary battery according to Embodiment 1.

REFERENCE SIGNS LIST 100, 200, 300 Lithium ion secondary battery (nonaqueous electrolyte secondary battery)
120, 220, 320 Flat wound electrode body
121, 221, 321 Positive electrode plate
121w, 221w, 321w Positive electrode portion
121m, 221m, 321m Positive electrode collector portion
121m1, 221m1, 321m1 Facing collector portion
121m1a, 221m1a, 321m1a Innermost facing collector portion
121m1ar, 221m1ar, 321m1ar Innermost semi-cylindrical facing collector portion
121m1ah, 221m1ah, 321m1ah Innermost flat facing collector portion
121m2, 221m2, 321m2 Non-facing collector portion
122 Positive electrode collector foil
123 Positive electrode active material layer
125, 225, 325 Collector cover layer
131 Negative electrode plate
131w Negative electrode portion
131m Negative electrode collector portion
132 Negative electrode collector foil
133 Negative electrode active material layer
141 Separator
700 Vehicle
800 Hammer drill
AX Axis line
SA One side in an axis line direction
SB The other side in the axis line direction
Tsm Thickness (of the collector cover layer)
Tsw Thickness (of the positive electrode active material layer)

MODE FOR CARRYING OUT THE INVENTION

Embodiment 1

Figure 2:
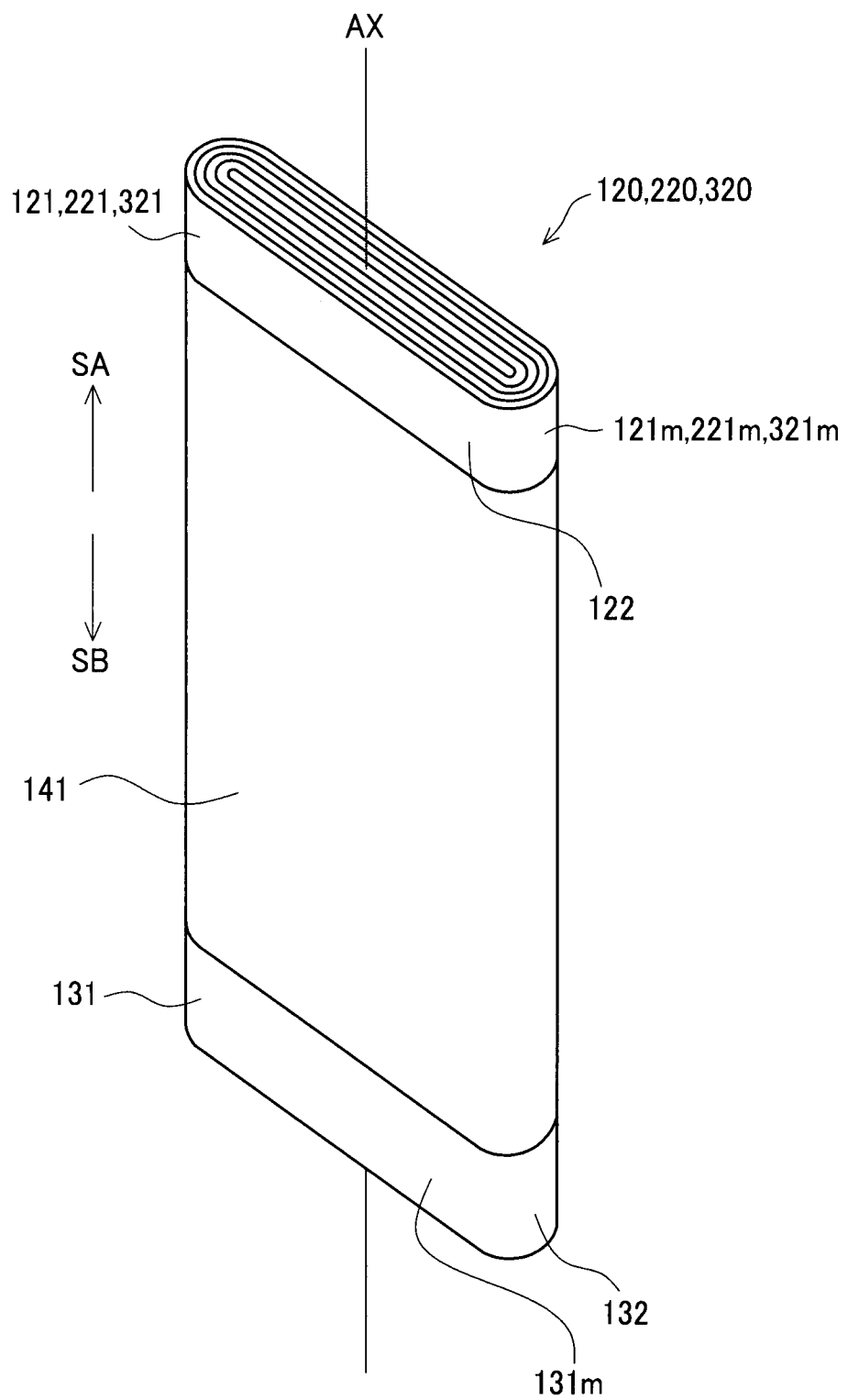
FIG. 2 is a perspective view of a flat wound electrode body in Embodiment 1.
Figure 3:
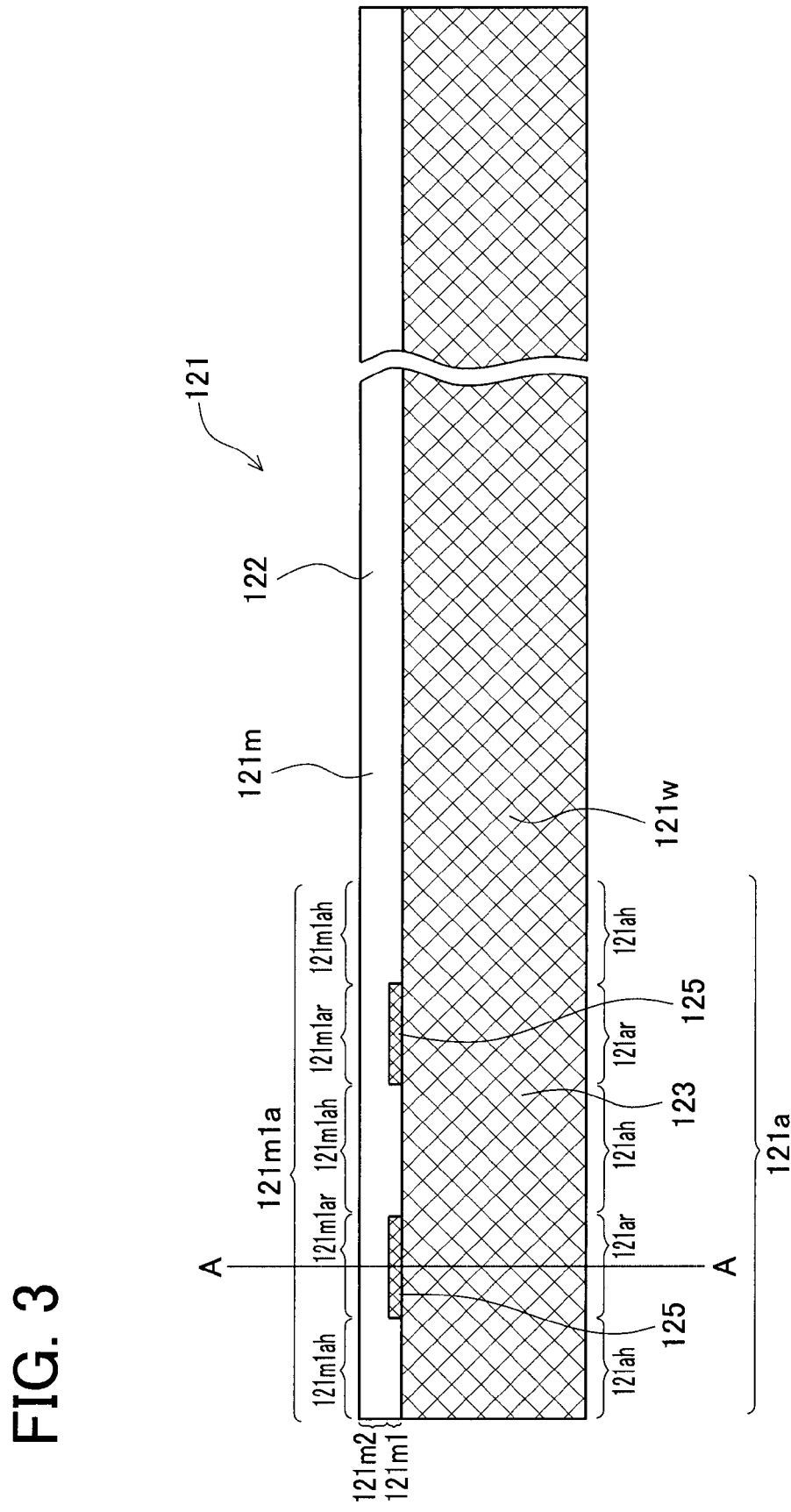
FIG. 3 is a plan view of a positive electrode plate in Embodiment 1.
Figure 4:
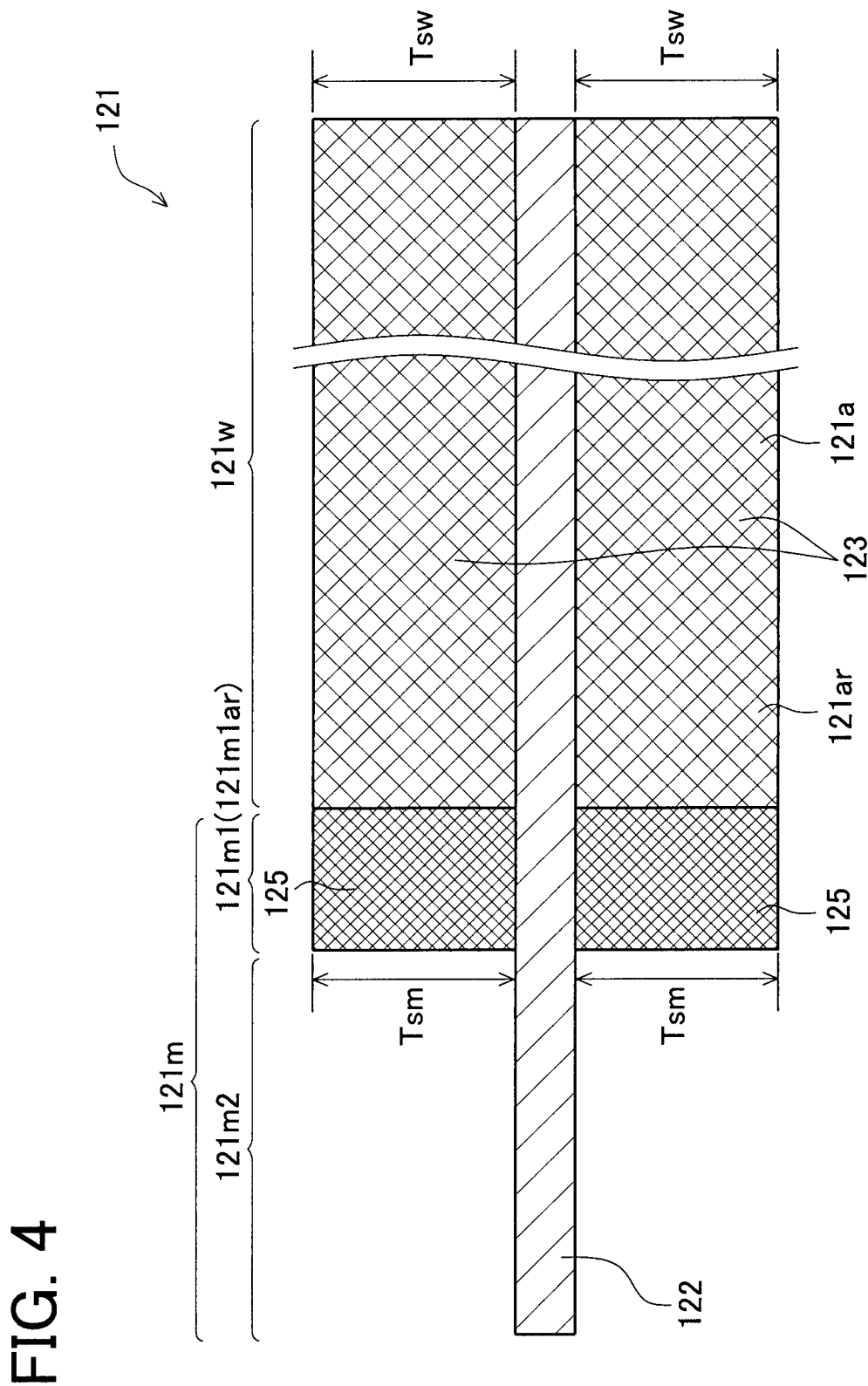
FIG. 4 is a sectional view of the positive electrode plate taken along a line A-A in FIG. 3 in Embodiment 1.
Figure 5:
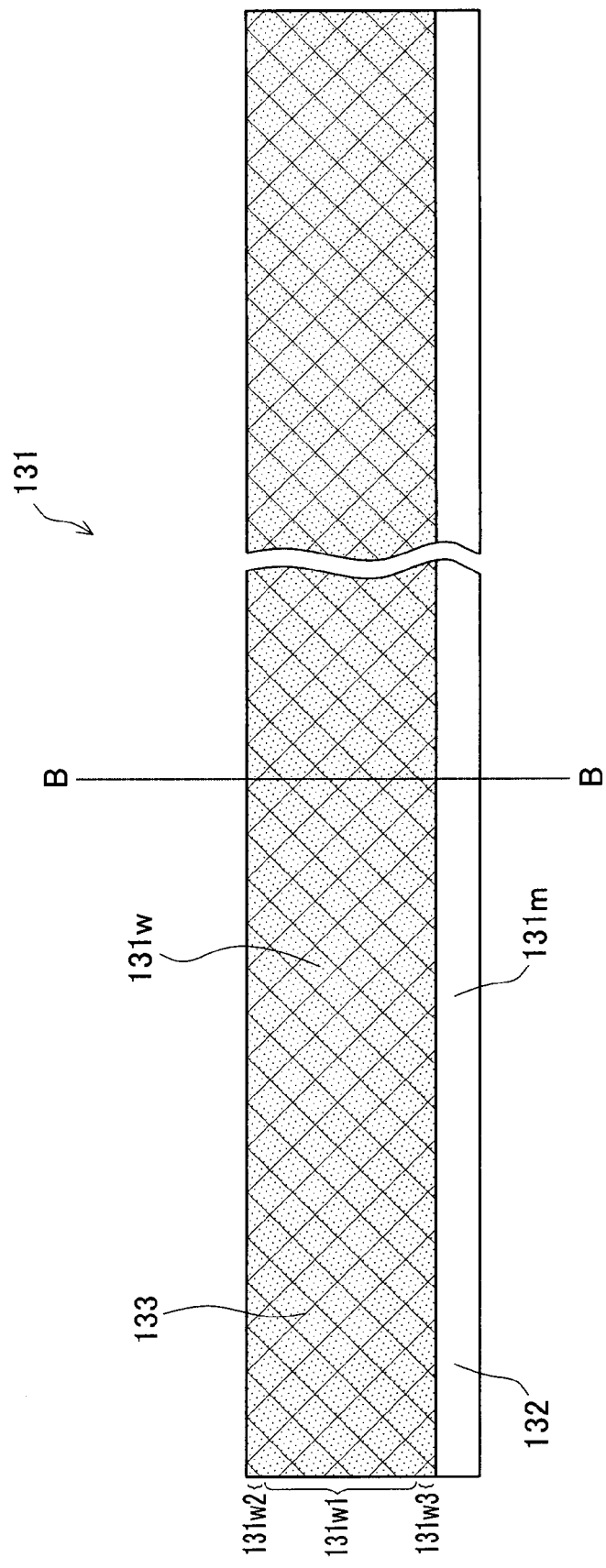
FIG. 5 is a plan view of a negative electrode plate in Embodiment 1.
Figure 6:
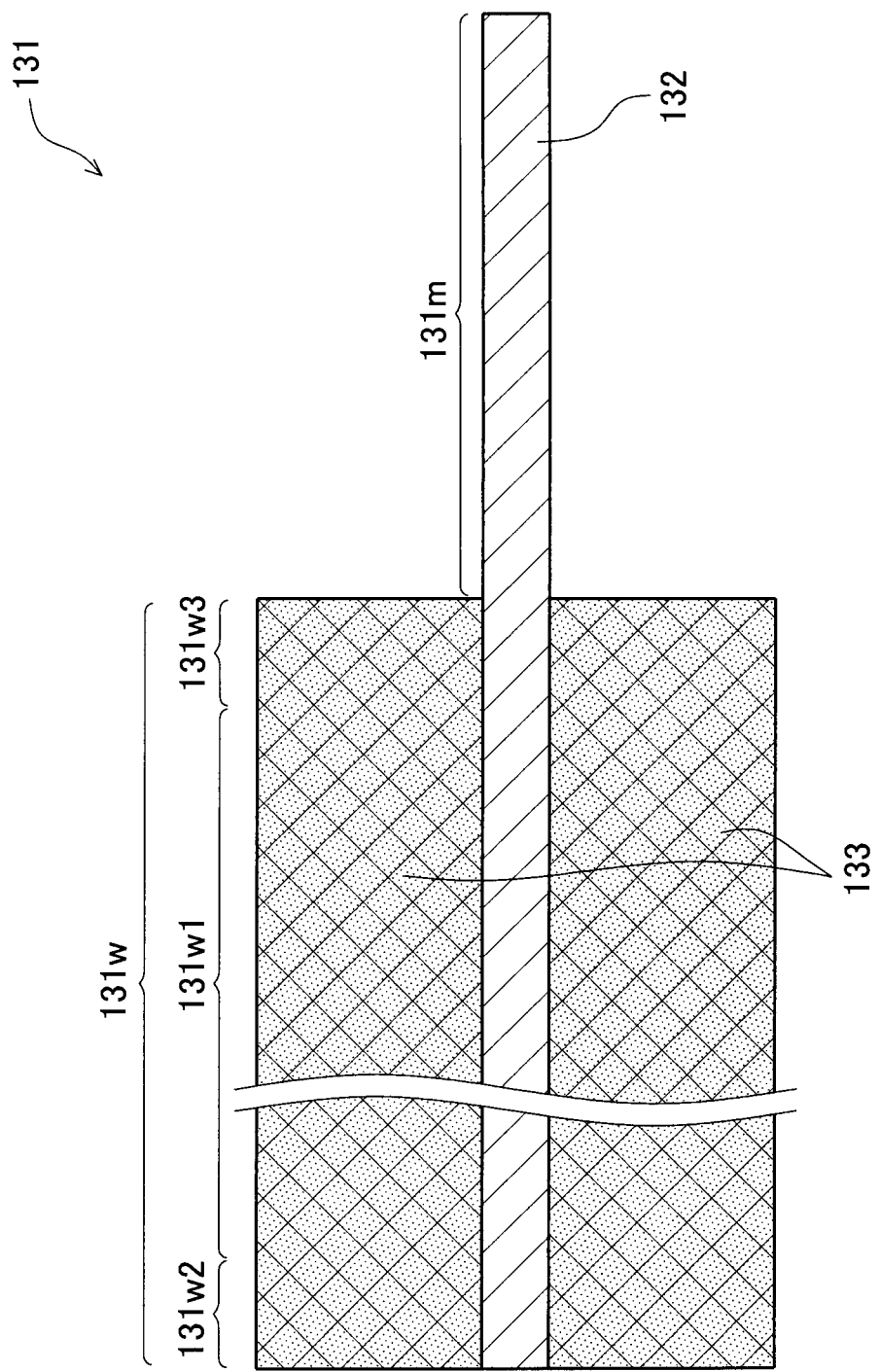
FIG. 6 is a sectional view of the negative electrode plate taken along a line B-B in FIG. 5 in Embodiment 1.
Figure 7:
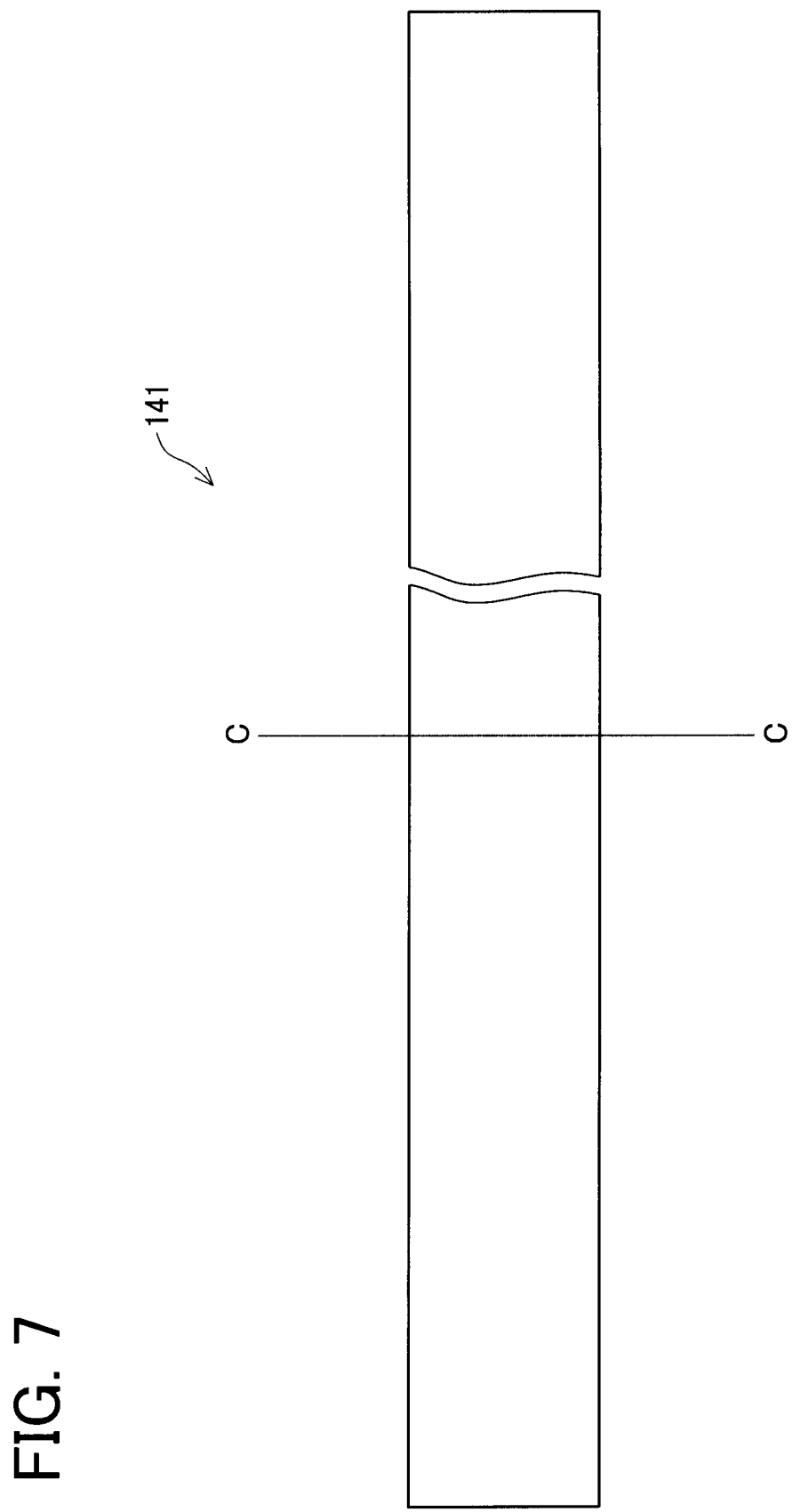
FIG. 7 is a plan view of a separator in Embodiment 1.
Figure 8:
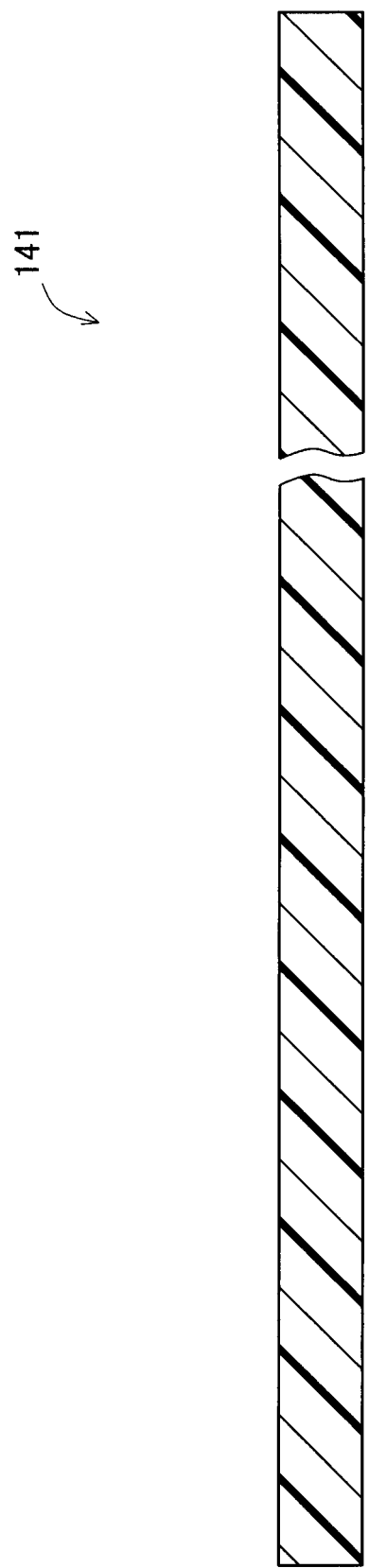
FIG. 8 is a sectional view of the separator taken along a line C-C in FIG. 7 in Embodiment 1.
Figure 9:
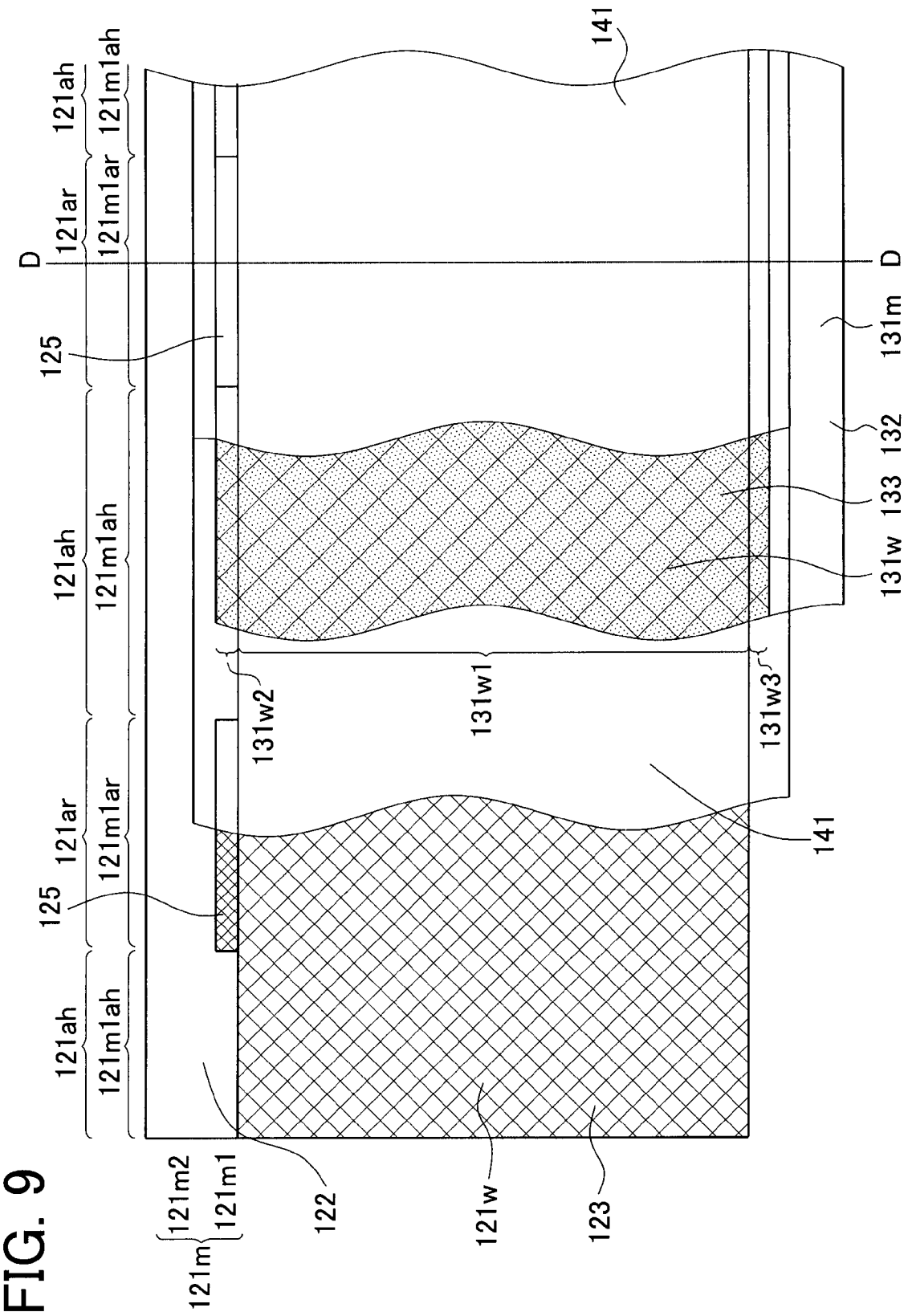
FIG. 9 is a partial plan view showing a state that the positive electrode plate and the negative electrode plate are overlapped upon one another with the separator interposed therebetween in Embodiment 1.
Figure 10:
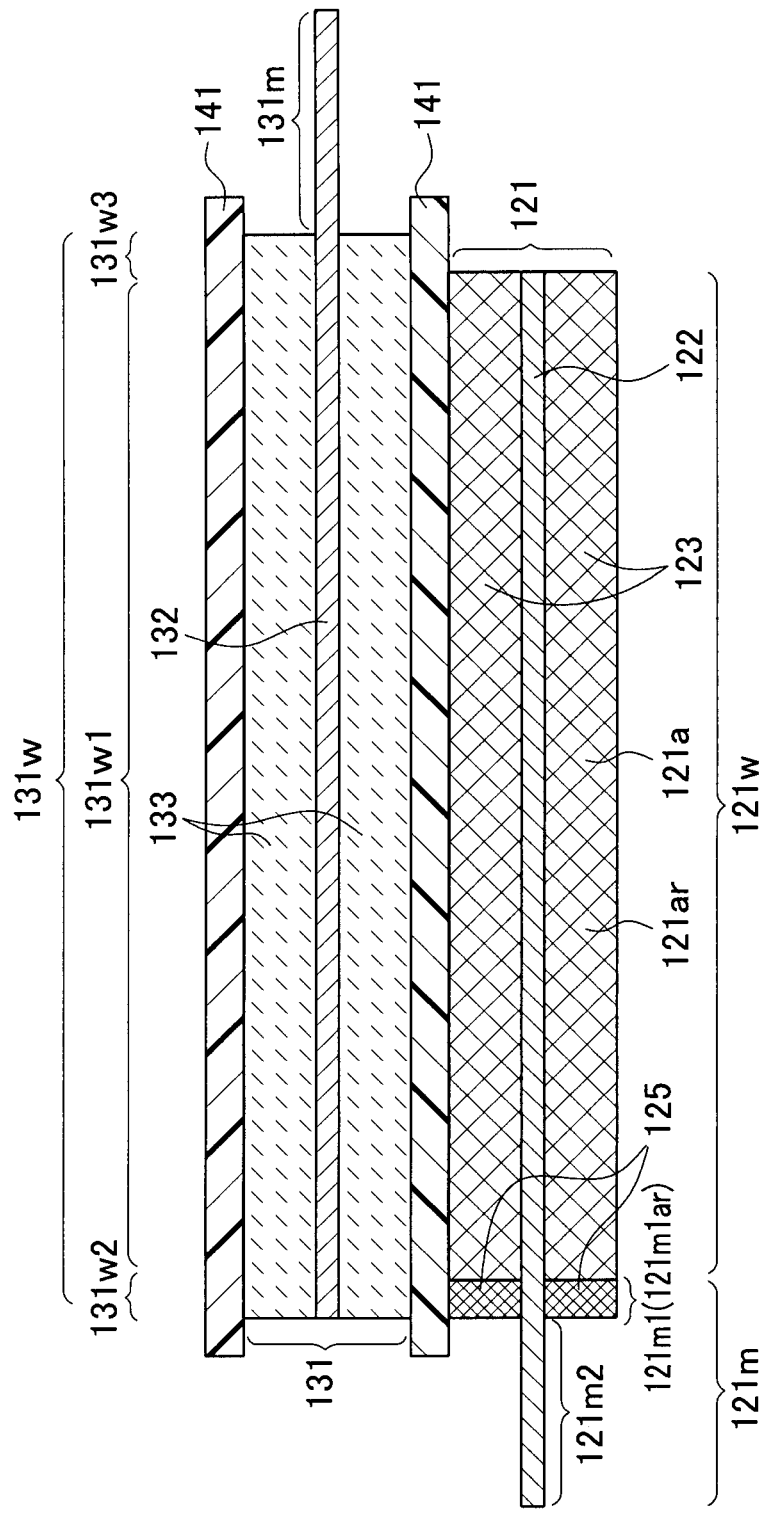
FIG. 10 is a sectional view taken along a line D-D in FIG. 9 showing the state that the positive electrode plate and the negative electrode plate are overlapped upon one another with the separator interposed therebetween in Embodiment 1.
Figure 11:
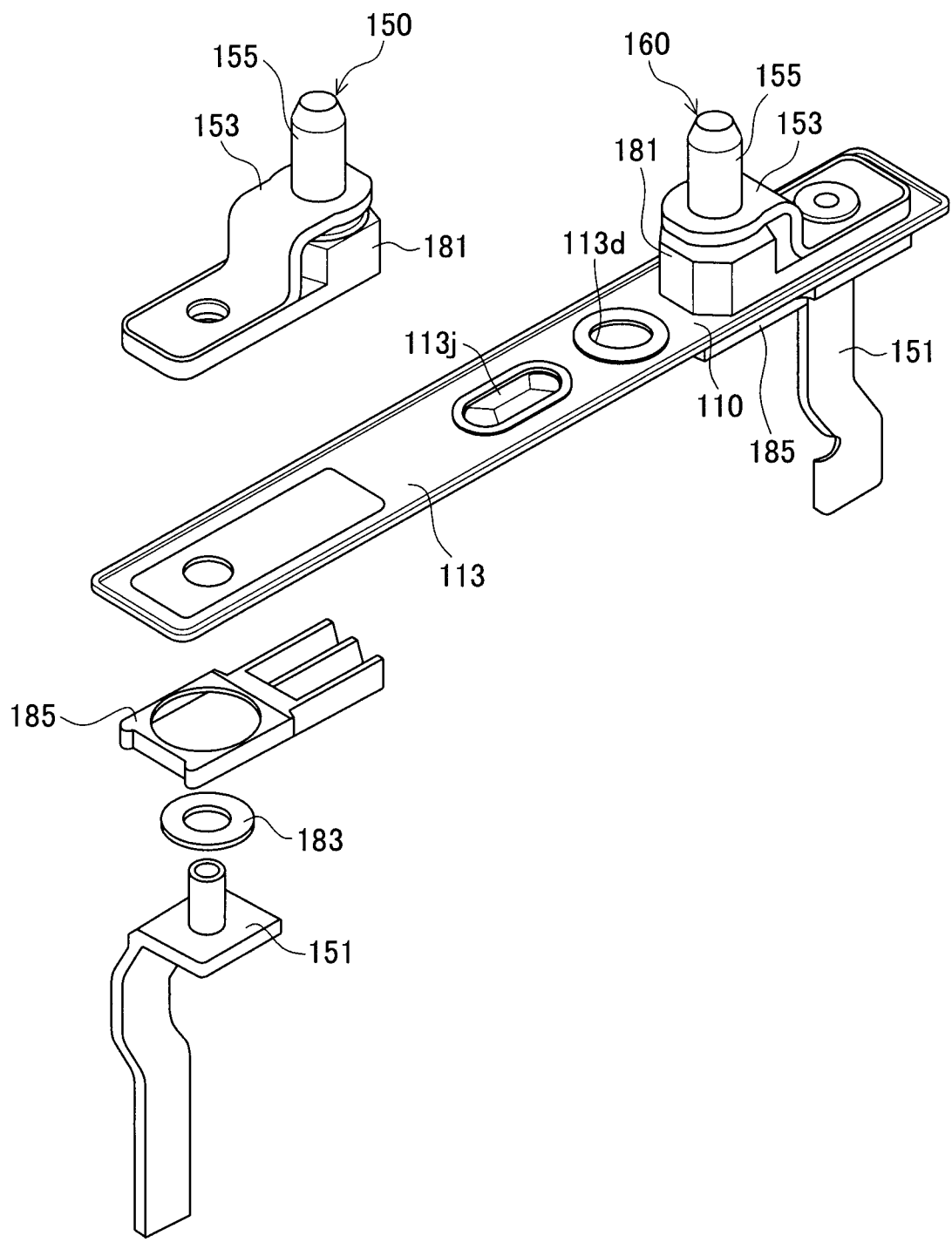
FIG. 11 is an exploded perspective view of a case lid member, a positive electrode terminal member, and a negative electrode terminal member and others in Embodiment 1.

Hereinafter, embodiments of the present invention will be described with reference to the drawings. FIG. 1 illustrates a lithium ion secondary battery (nonaqueous electrolyte secondary battery) 100 according to Embodiment 1. FIG. 2 illustrates a flat wound electrode body 120 constituting this lithium ion secondary battery 100. Further, a positive electrode plate 121 of this flat wound electrode body 120 is illustrated in FIGS. 3 and 4, a negative electrode plate 131 is illustrated in FIGS. 5 and 6, and a separator 141 is illustrated in FIGS. 7 and 8. FIGS. 9 and 10 illustrate the positive electrode plate 121 and the negative electrode plate 131 overlapped upon one another with the separator 141 interposed therebetween. FIG. 11 illustrates the details of a case lid member 113, a positive electrode terminal member 150, and a negative electrode terminal member 160, and others.

This lithium ion secondary battery 100 is a prismatic battery mounted on vehicles such as hybrid vehicles and electric vehicles, or battery powered equipment such as hammer drills. This lithium ion secondary battery 100 is formed by a prismatic battery case 110, the flat wound electrode body 120 accommodated in this battery case 110, and the positive and negative electrode terminal members 150 and 160, and others supported on the battery case 110 (see FIG. 1). Electrolyte (not shown) is injected into the battery case 110.

Of these, the battery case 110 is formed by a box-like case body member 111 having an opening only at the top, and a rectangular plate-like case lid member 113 welded to this case body member 111 such as to close an opening 111h thereof. The case lid member 113 is provided with a safety valve 113j that breaks when the internal pressure of the battery case 110 reaches a predetermined level (see FIGS. 1 and 11). The case lid member 113 is also provided with an electrolyte inlet port 113d for pouring the electrolyte into the battery case 110.

To the case lid member 113 are fixedly attached the positive and negative electrode terminal members 150 and 160 via three insulating members 181, 183, and 185 each. These positive and negative electrode terminal members 150 and 160 are each formed by three terminal metal fittings 151, 153, and 155. The positive electrode terminal member 150 is connected to the positive electrode plate 121 of the flat wound electrode body 120, while the negative electrode terminal member 160 is connected to the negative electrode plate 131 of the electrode body 120, inside the battery case 110.

Next, the flat wound electrode body 120 will be described. This electrode body 120 is encased in an insulating film envelope 170 made of a bag-shaped insulating film with an opening only at the top and accommodated in the battery case 110, placed horizontally on its side (see FIG. 1). This electrode body 120 is formed by winding the elongated positive electrode plate 121 (see FIGS. 3 and 4) and the elongated negative electrode plate 131 (see FIGS. 5 and 6) overlapped upon one another via an elongated air permeable separator 141 (see FIGS. 7 and 8) around an axis line AX and by compressing these into a flat shape (see FIGS. 9, 10, and 2).

A positive electrode collector portion 121m, to be described later, of the positive electrode plate 121 protrudes in a spiral form from the separator 141 on one side SA in the axis line AX direction (left side in FIG. 1, upper side in FIG. 2) of the flat wound electrode body 120. On the other hand, a negative electrode collector portion 131m, to be described later, of the negative electrode plate 131 protrudes in a spiral form from the separator 141 on the other side SB in the axis line AX direction (right side in FIG. 1, lower side in FIG. 2) of the electrode body 120.

Of these, the positive electrode plate 121 has a positive electrode collector foil 122 made of an elongated aluminum foil having a thickness of 15 nm as a core, as shown in FIGS. 3, 4, 9, and 10. This positive electrode collector foil 122 is provided on each of both sides with a positive electrode active material layer 123 of a thickness Tsw of 35 nm in a strip shape along the longitudinal direction (left and right direction in FIGS. 3 and 9, direction orthogonal to the paper plane in FIGS. 4 and 10). This positive electrode active material layer 123 is made of a positive electrode active material, a conductive agent, and a binder.

A strip-shaped portion of the positive electrode plate 121 where the positive electrode active material layers 123 are present in its thickness direction constitutes the positive electrode portion 121w. This positive electrode portion 121w faces a negative electrode portion 131w (more particularly, a negative electrode central portion 131w1) to be described later of the negative electrode plate 131 in its entirety via the separator 141 in the electrode body 120 configuration (see FIGS. 9 and 10).

With the positive electrode portion 121w being provided to the positive electrode plate 121, one end (upper side in FIGS. 3 and 9, left side in FIGS. 4 and 10) in the width direction of the positive electrode collector foil 122 extends in the longitudinal direction in a strip shape and thereby forms the positive electrode collector portion 121m where no positive electrode active material layers 123 are present in its thickness direction.

This positive electrode collector portion 121m includes a facing collector portion 121m1 and a non-facing collector portion 121m2. The facing collector portion 121m1 is a strip-shaped portion adjacent to one side SA in the axis line AX direction of the positive electrode portion 121w (upper side in FIGS. 3 and 9) and facing the negative electrode portion 131w (more particularly a negative electrode one side portion 131w2) to be described later of the negative electrode plate 131 via the separator 141 in the electrode body 120 configuration. The non-facing collector portion 121m2 is adjacent to this facing collector portion 121m1 further on one side SA in the axis line AX direction and not facing the negative electrode plate 131.

The positive electrode plate 121 further includes an innermost portion 121a (see FIG. 3 and others) located innermost of the electrode body 120 configuration. Further, this innermost portion 121a includes two innermost semi-cylindrical portions 121ar bent into a semi-cylindrical shape and innermost flat portions 121ah that are flat and located in between these innermost semi-cylindrical portions 121ar (see FIGS. 3, 4, 9, and 10).

An innermost facing collector portion 121m1a refers to a part of the facing collector portion 121m1 included in the innermost portion 121a of the positive electrode plate 121. An innermost semi-cylindrical facing collector portion 121m1ar refers to a part of the facing collector portion 121m1 included in the innermost semi-cylindrical portion 121ar of the positive electrode plate 121, and an innermost flat facing collector portion 121m1ah refers to a part included in the innermost flat portion 121ah of the positive electrode plate 121.

The positive electrode plate 121 of Embodiment 1 further includes a plurality of (specifically, two) collector cover layers 125 having electrical insulation properties and heat resistance with a melting point of 350° C. or more and covering parts of the facing collector portion 121m1 in the longitudinal direction (see FIGS. 3, 4, 9, and 10). More specifically, these collector cover layers 125 are made of polyimide. These collector cover layers 125 cover the above-mentioned two innermost semi-cylindrical facing collector portions 121m1ar of the facing collector portion 121m1. The collector cover layer 125 has a thickness Tsm of 35 μm, which is equal to the thickness Tsw of the previously described positive electrode active material layer 123.

Next, the negative electrode plate 131 will be described. The negative electrode plate 131 has a negative electrode collector foil 132 made of an elongated copper foil having a thickness of 10 μm as a core, as shown in FIGS. 5, 6, 9, and 10. This negative electrode collector foil 132 is provided on each of both sides with a negative electrode active material layer 133 having a thickness of 30 μm in a strip shape along the longitudinal direction (left and right direction in FIGS. 5 and 9, direction orthogonal to the paper plane in FIGS. 6 and 10). The negative electrode active material layer 133 is made of a negative electrode active material, a binder, and a thickener.

A strip-shaped portion of the negative electrode plate 131 where the negative electrode active material layers 133 are present in its thickness direction constitutes the negative electrode portion 131w. This negative electrode portion 131w includes a negative electrode central portion 131w1, a negative electrode one side portion 131w2, and a negative electrode other side portion 131w3 in the flat wound electrode body 120 configuration. The negative electrode central portion 131w1 is a strip-shaped portion located at the center in the axis line AX direction (width direction) of the negative electrode portion 131w and facing the positive electrode portion 121w of the positive electrode plate 121 via the separator 141 (see FIGS. 5, 6, 9, and 10).

The negative electrode one side portion 131w2 is a strip-shaped portion adjacent to one side SA in the axis line AX direction of the negative electrode central portion 131w1 (upper side in FIGS. 5 and 9, left side in FIGS. 6 and 10) and facing the positive electrode collector portion 121m (more particularly, facing collector portion 121m1) of the positive electrode plate 121 via the separator 141. The negative electrode other side portion 131w3 is a strip-shaped portion adjacent to the other side SB in the axis line AX direction of the central portion 131w1 (lower side in FIGS. 5 and 9, right side in FIGS. 6 and 10) and not facing the positive electrode plate 121 but facing only the separator 141.

With the negative electrode portion 131w being provided to the negative electrode plate 131, the other end (lower side in FIGS. 5 and 9, right side in FIGS. 6 and 10) in the width direction of the negative electrode collector foil 132 extends in the longitudinal direction in a strip shape and thereby forms the negative electrode collector portion 131m where no negative electrode active material layers 133 are present in its thickness direction.

The separator 141 (see FIGS. 7, 8, 9, and 10) is made of a known resin and in the elongated shape.

As described above, in the lithium ion secondary battery 100 of Embodiment 1, the positive electrode plate 121 forming the flat wound electrode body 120 includes the collector cover layers 125 each covering the two innermost semi-cylindrical facing collector portions 121m1ar of the facing collector portion 121m1 of the positive electrode collector portion 121m. The collector cover layers 125 are each arranged between the innermost semi-cylindrical facing collector portions 121m1ar (positive electrode collector foil 122) and the separator 141 in the electrode body 120 configuration, so that the gap between the innermost semi-cylindrical facing collector portions 121m1ar (positive electrode collector foil 122) and the separator 141 can be made small.

In Embodiment 1, in particular, since the thickness Tsm of the collector cover layer 125 is made larger than or equal to the thickness Tsw of the positive electrode active material layer, the collector cover layer 125 can have close contact with the separator 141 in the flat wound electrode body 120 configuration, leaving no gap between the innermost semi-cylindrical facing collector portions 121m1ar (positive electrode collector foil 122) and the separator 141.

Therefore, even if the positive electrode active material layer 123 peels off of the positive electrode collector foil 122 in the innermost semi-cylindrical portions 121ar of the positive electrode plate 121, the peeled fragments of the positive electrode active material layer 123 can be prevented from moving from one side SA in the axis line AX direction of the electrode body 120 to various parts thereof through space between the positive electrode collector portion 121m and the separator 141. Accordingly, in this lithium ion secondary battery 100, a short circuit in the electrode body 120 resulting from peeled fragments of the positive electrode active material layer 123 can be prevented.

Even if the flat wound electrode body 120 should become hot due to the heat generated for example in the last stage of overcharge, and large heat shrinkage in the axis line AX direction should occur on a portion of the separator 141 facing the innermost semi-cylindrical facing collector portion 121m1ar particularly prone to become hot, the collector cover layer 125 interposed between the innermost semi-cylindrical facing collector portion 121m1ar and the negative electrode portion 131w prevents contact and a short circuit between the positive electrode collector portion 121m (innermost semi-cylindrical facing collector portion 121m1ar) and the negative electrode portion 131w.

In Embodiment 1, in particular, since the thickness Tsm of the collector cover layer 125 is made larger than or equal to the thickness Tsw of the positive electrode active material layer 123, the separator 141 is retained between the collector cover layer 125 and the negative electrode portion 131w of the negative electrode plate 131. Therefore, even when the flat wound electrode body 120 becomes hot, heat shrinkage can hardly occur on the separator 141 in this portion. Thus contact and a short circuit between the positive electrode collector portion 121m (innermost semi-cylindrical facing collector portion 121m1ar) and the negative electrode portion 131w can be prevented more reliably.

In Embodiment 1, the collector cover layers 125 are formed at a location within N/2 turns counted from inside of the flat wound electrode body 120 where N is the number of turns of winding of the positive electrode plate 121, and not outside the N/2 turns. The collector cover layers 125 are formed only to a limited area in a portion on the inner side, so that an increase in battery weight involved in the formation of the collector cover layers 125 can be restricted. Further, forming the collector cover layers 125 reduces the possibility of electrolyte not permeating well into the flat wound electrode body 120 during manufacture of the battery.

Next, the method of manufacturing the lithium ion secondary battery 100 will be described.

First, the positive electrode plate 121 is fabricated. Namely, the positive electrode collector foil 122 made of an elongated aluminum foil is prepared. Then, a positive electrode active material paste containing a positive electrode active material, a conductive agent, and a binder is applied on one main surface of this positive electrode collector foil 122 while forming the longitudinally extending strip-shaped positive electrode collector portion 121m, and dried with hot air to form the strip-shaped positive electrode portion 121w. Similarly, the positive electrode active material paste is applied on the opposite main surface of the positive electrode collector foil 122 while forming the strip-shaped positive electrode collector portion 121m, and dried with hot air to form the strip-shaped positive electrode portion 121w. After that, the positive electrode active material layers 123 are compressed using a pressure roller in order to increase electrode density.

Next, the collector cover layers 125 are formed. More specifically, an insulating tape made of polyimide is affixed on the positive electrode collector portion 121m, to each of the portions that will be the innermost semi-cylindrical facing collector portions 121m1ar of the facing collector portion 121m1 when the flat wound electrode body 120 is configured. Thus the positive electrode plate 121 described above is formed (see FIGS. 3 and 4).

The negative electrode plate 131 is fabricated separately. Namely, the negative electrode collector foil 132 made of an elongated copper foil is prepared. Then, a negative electrode active material paste containing a negative electrode active material, a binder, and a thickener is applied on one main surface of this negative electrode collector foil 132 while forming the longitudinally extending strip-shaped negative electrode collector portion 131m, and dried with hot air to form the strip-shaped negative electrode portion 131w. The negative electrode active material paste is applied on the opposite main surface of the negative electrode collector foil 132 while forming the strip-shaped negative electrode collector portion 131m, and dried with hot air to form the strip-shaped negative electrode portion 131w. After that, the negative electrode active material layers 133 are compressed using a pressure roller in order to increase electrode density. Thus the negative electrode plate 131 is formed (see FIGS. 5 and 6).

An elongated separator 141 is prepared. The positive electrode plate 121 and the negative electrode plate 131 are overlapped upon one another via the separator 141 (see FIGS. 9 and 10), and these are wound around the axis line AX using a winding core, and compressed into a flat shape thereafter to form the flat wound electrode body 120 described above (see FIG. 2).

Next, the battery is assembled using this electrode body 120. After that, electrolyte is poured into the battery case 110 from the electrolyte inlet port 113d, which is then sealed. Thus the lithium ion secondary battery 100 is completed.

Embodiment 2

Next, a second embodiment will be described with reference to FIG. 12 to FIG. 14. A collector cover layer 225 of a lithium ion secondary battery 200 of Embodiment 2 has a different design from the collector cover layer 125 of the lithium ion secondary battery 100 of Embodiment 1. Other features are similar to Embodiment 1 described above, and therefore description of parts similar to Embodiment 1 will be omitted or simplified.

Figure 12:
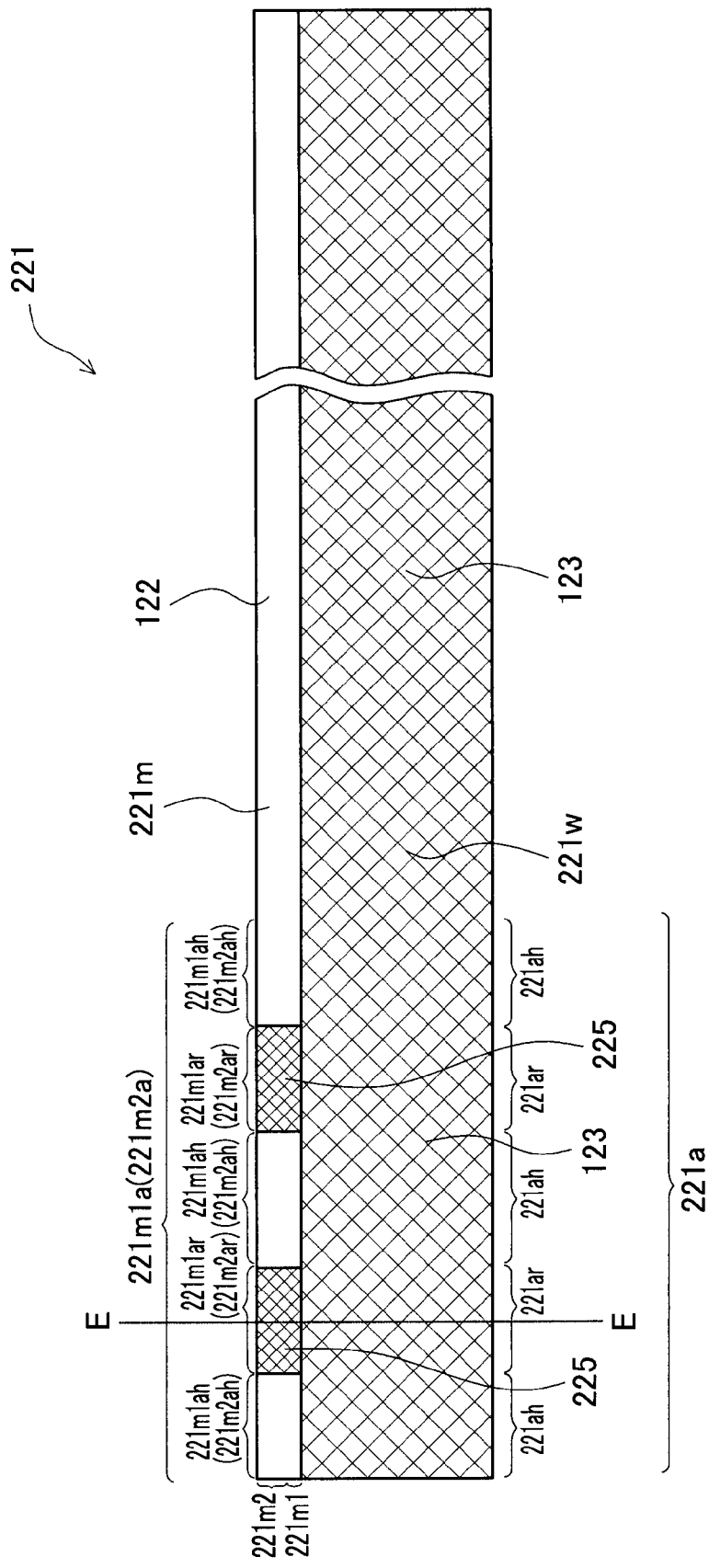
FIG. 12 is a plan view of a positive electrode plate in Embodiment 2.
Figure 13:
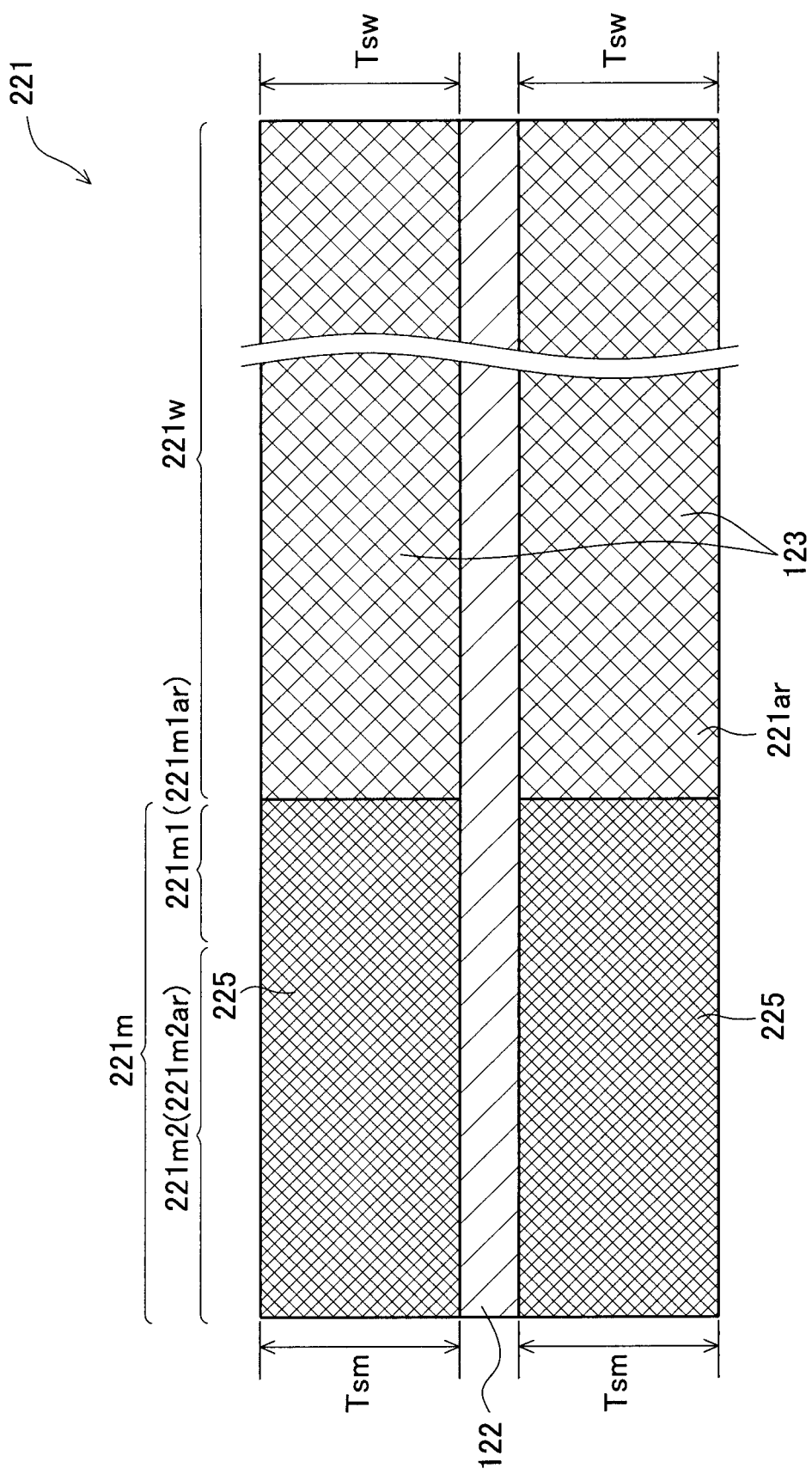
FIG. 13 is a sectional view of the positive electrode plate taken along a line E-E in FIG. 12 in Embodiment 2.
Figure 14:
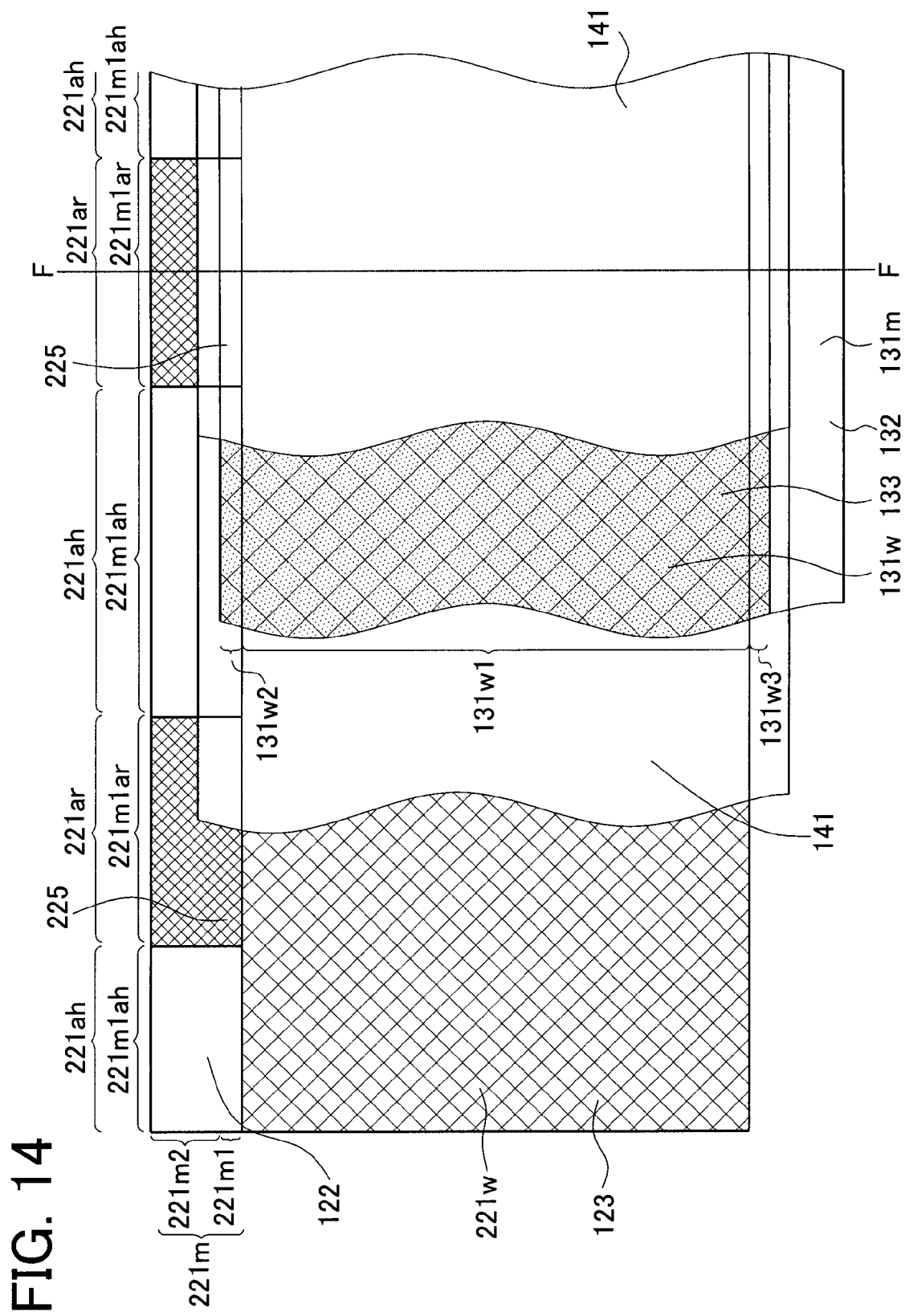
FIG. 14 is a partial plan view showing a state that the positive electrode plate and a negative electrode plate are overlapped upon one another with a separator interposed therebetween in Embodiment 2.
Figure 15:
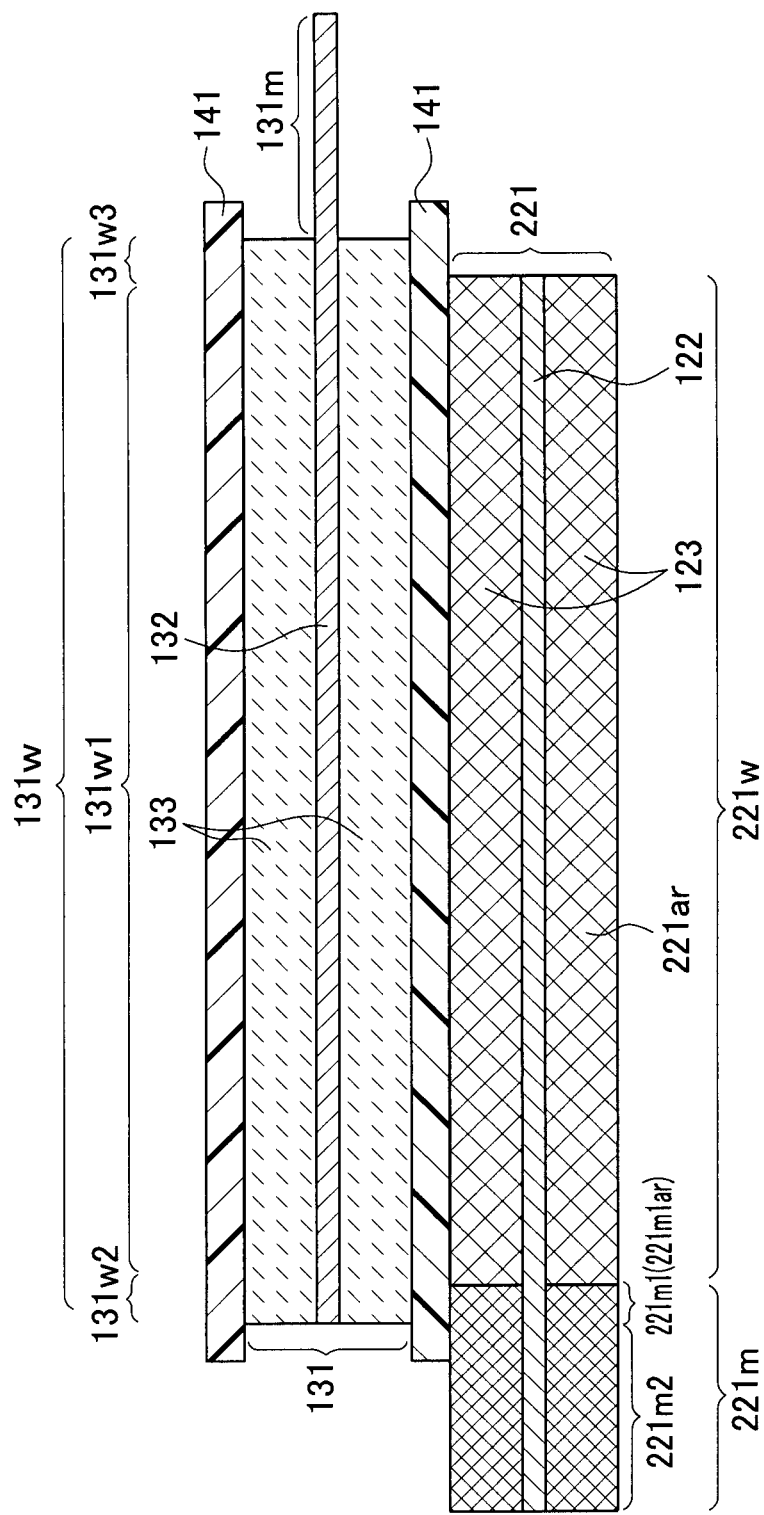
FIG. 15 is a sectional view taken along a line F-F in FIG. 14 showing the state that the positive electrode plate and the negative electrode plate are overlapped upon one another with the separator interposed therebetween in Embodiment 2.
Figure 16:
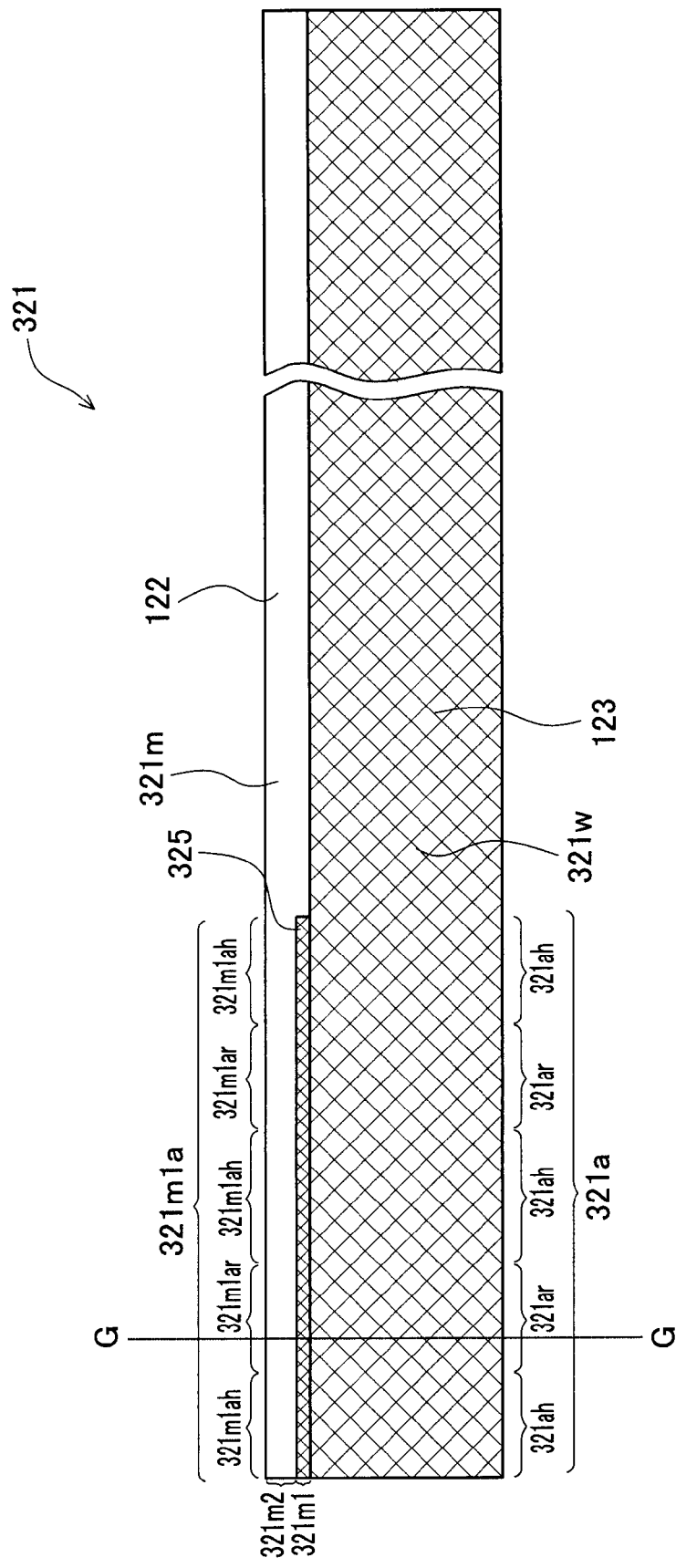
FIG. 16 is a plan view of a positive electrode plate in Embodiment 3.
Figure 17:
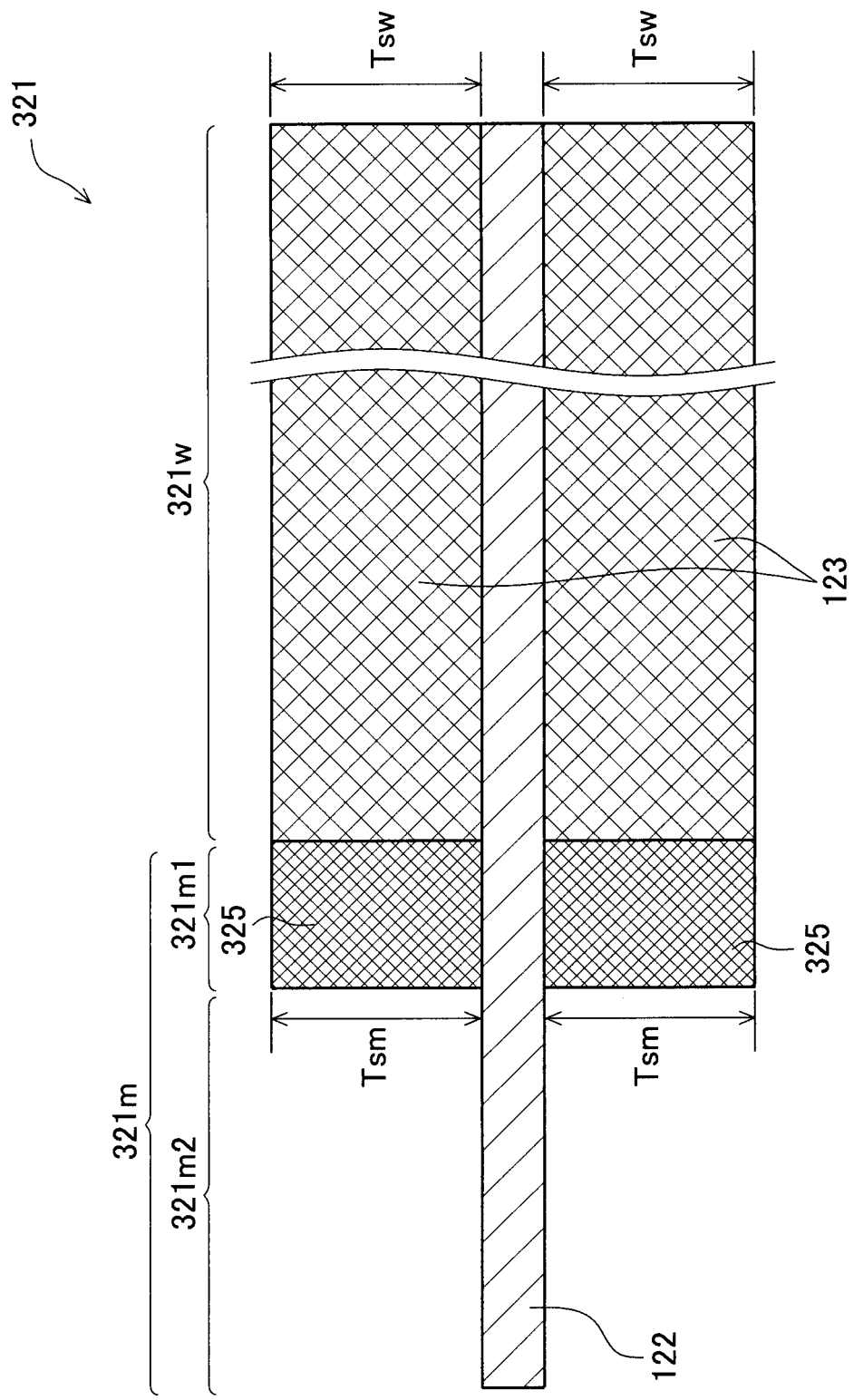
FIG. 17 is a sectional view of the positive electrode plate taken along a line G-G in FIG. 16 in Embodiment 3.
Figure 18:
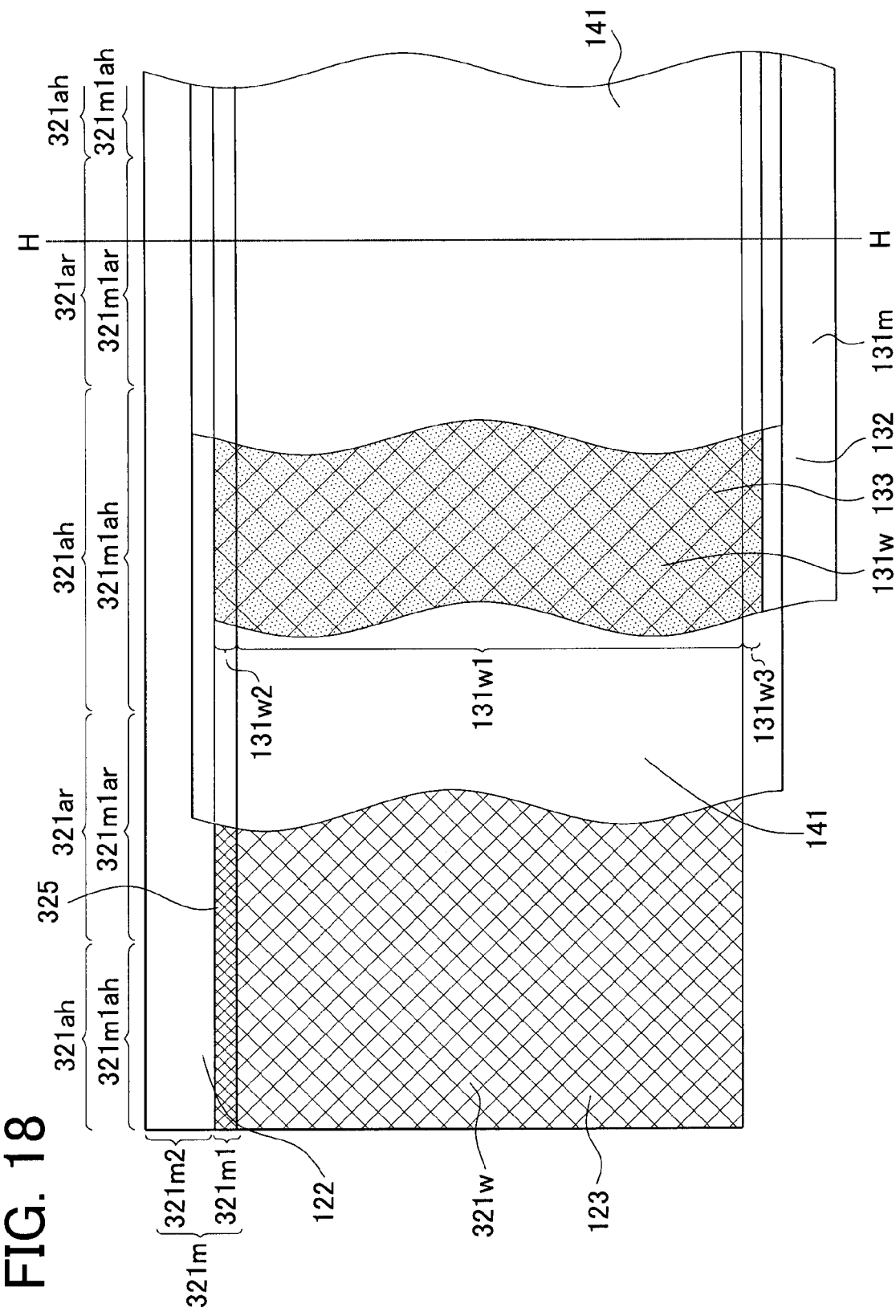
FIG. 18 is a partial plan view showing a state that the positive electrode plate and a negative electrode plate are overlapped upon one another with a separator interposed therebetween in Embodiment 3.
Figure 19:
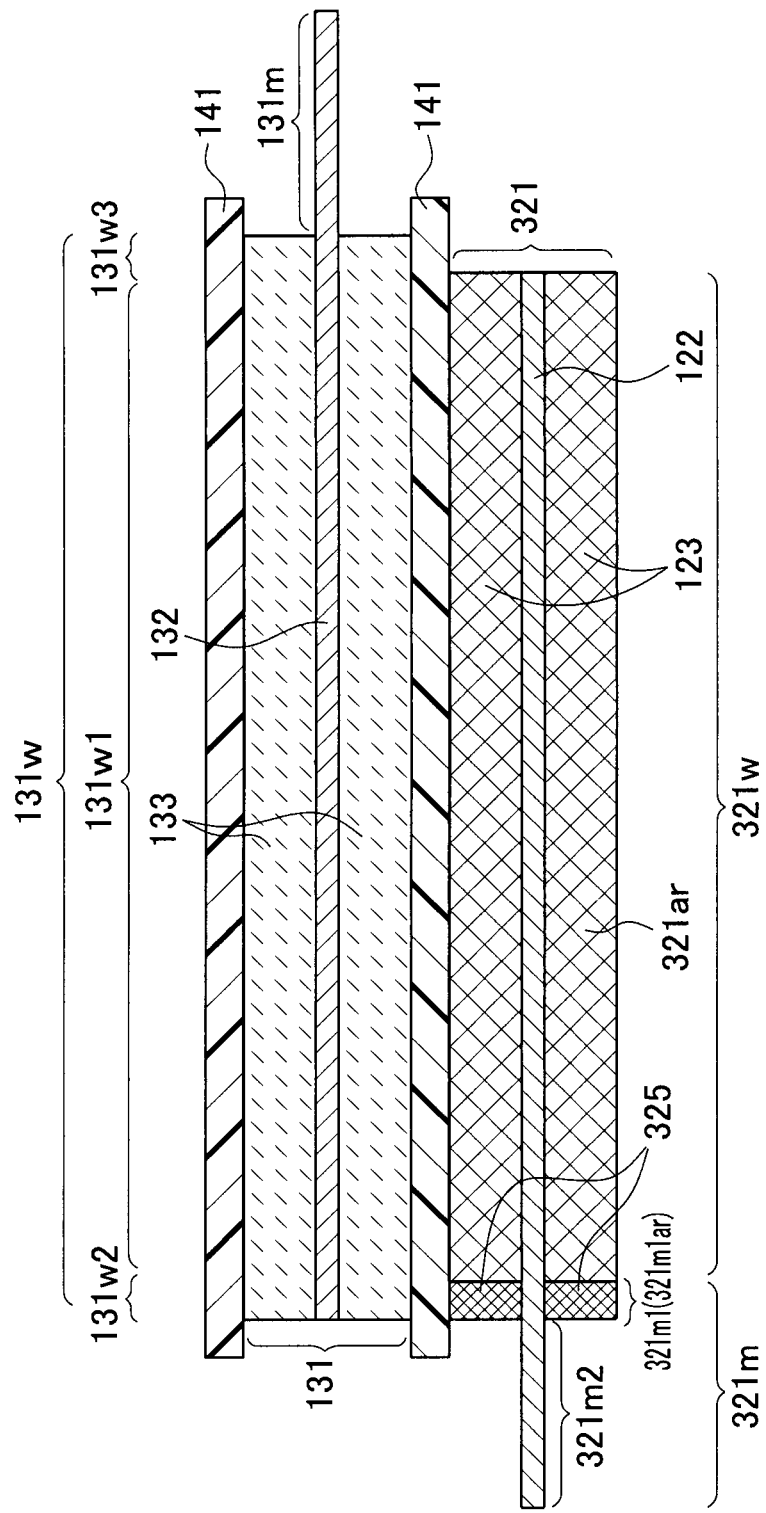
FIG. 19 is a sectional view taken along a line H-H in FIG. 18 showing the state the state that the positive electrode plate and the negative electrode plate are overlapped upon one another with the separator interposed therebetween in Embodiment 3.

A positive electrode plate 221 according to Embodiment 2 includes the positive electrode collector foil 122 and the positive electrode active material layers 123 similar to those of Embodiment 1 as shown in FIGS. 12 to 14. This positive electrode plate 221 includes a positive electrode portion 221w, and a positive electrode collector portion 221m consisting of a facing collector portion 221m1 and a non-facing collector portion 221m2, similarly to Embodiment 1.

The positive electrode plate 221 further includes an innermost portion 221a (see FIG. 12 and others) located innermost of a flat wound electrode body 220 configuration. Further, this innermost portion 221a includes two innermost semi-cylindrical portions 221ar bent into a semi-cylindrical shape and innermost flat portions 221ah that are flat and located in between these innermost semi-cylindrical portions 221ar (see FIGS. 12 to 14).

An innermost facing collector portion 221m1a refers to a part of the facing collector portion 221m1 included in the innermost portion 221a of the positive electrode plate 221. An innermost semi-cylindrical facing collector portion 221m1ar refers to a part of the facing collector portion 221m1 included in the innermost semi-cylindrical portion 221ar of the positive electrode plate 221, and an innermost flat facing collector portion 221m1ah refers to a part included in the innermost flat portion 221ah of the positive electrode plate 221.

An innermost non-facing collector portion 221m2a refers to a part of the non-facing collector portion 221m2 included in the innermost portion 221a of the positive electrode plate 221. An innermost semi-cylindrical non-facing collector portion 221m2ar refers to a part of the non-facing collector portion 221m2 included in the innermost semi-cylindrical portion 221ar of the positive electrode plate 221, and an innermost flat non-facing collector portion 221m2ah refers to a part included in the innermost flat portion 221ah of the positive electrode plate 221.

This positive electrode plate 221 includes a plurality of (specifically, two) collector cover layers 225 made of a polyimide tape having electrical insulation properties and heat resistance with a melting point of 350° C. or more. These collector cover layers 225 cover not only the innermost semi-cylindrical facing collector portions 221m1ar of the facing collector portion 221m1 but also the innermost semi-cylindrical non-facing collector portions 221m2ar of the non-facing collector portion 221m2. The collector cover layers 225 are each arranged to snugly fit in between the innermost semi-cylindrical facing collector portions 221m1ar (positive electrode collector foil 122) and the separator 141 in the flat wound electrode body 220 configuration, so that there is no gap between the innermost semi-cylindrical facing collector portions 221m1ar (positive electrode collector foil 122) and the separator 141.

Therefore, even if the positive electrode active material layer 123 peels off of the positive electrode collector foil 122 in the innermost semi-cylindrical portions 221ar of the positive electrode plate 221, the peeled fragments of the positive electrode active material layer 123 can be prevented from moving from one side SA in the axis line AX direction of the flat wound electrode body 220 to various parts thereof through space between the positive electrode collector portion 221m and the separator 141. Accordingly, in this lithium ion secondary battery 200, a short circuit in the electrode body 220 resulting from peeled fragments of the positive electrode active material layer 123 can be prevented.

Even if the flat wound electrode body 220 should become hot due to the heat generated for example in the last stage of overcharge, and large heat shrinkage in the axis line AX direction should occur on a portion of the separator 141 facing the innermost semi-cylindrical facing collector portion 221m1ar particularly prone to become hot, the collector cover layer 225 interposed between the innermost semi-cylindrical facing collector portion 221m1ar and the negative electrode portion 131w prevents contact and a short circuit between the positive electrode collector portion 221m (innermost semi-cylindrical facing collector portion 221m1ar) and the negative electrode portion 131w.

In Embodiment 2, in particular, since the thickness Tsm of the collector cover layer 225 is made larger than or equal to the thickness Tsw of the positive electrode active material layer 123, the separator 141 is retained between the cover layer 225 and the negative electrode portion 131w of the negative electrode plate 131. Therefore, even when the flat wound electrode body 220 becomes hot, heat shrinkage can hardly occur on the separator 141 in this portion. Thus contact and a short circuit between the positive electrode collector portion 221m (innermost semi-cylindrical facing collector portion 221m1ar) and the negative electrode portion 131w can be prevented more reliably. Other parts similar to Embodiment 1 provide the similar effects as those of Embodiment 1.

Embodiment 3

Next, a third embodiment will be described with reference to FIG. 16 to FIG. 19. A collector cover layer 325 of a lithium ion secondary battery 300 of Embodiment 3 has a different design from the collector cover layers 125 and 225 of the lithium ion secondary batteries 100 and 200 of Embodiments 1 and 2. Other features are similar to Embodiment 1 or 2 described above, and therefore description of parts similar to Embodiment 1 or 2 will be omitted or simplified.

A positive electrode plate 321 according to Embodiment 3 includes the positive electrode collector foil 122 and the positive electrode active material layers 123 similar to those of Embodiment 1 as shown in FIGS. 16 to 19. This positive electrode plate 321 includes a positive electrode portion 321w and a positive electrode collector portion 321m consisting of a facing collector portion 321m1 and a non-facing collector portion 321m2, similarly to Embodiment 1.

The positive electrode plate 321 further includes an innermost portion 321a (see FIG. 16 and others) located innermost of a flat wound electrode body 320 configuration. Further, this innermost portion 321a includes two innermost semi-cylindrical portions 321ar bent into a semi-cylindrical shape and innermost flat portions 321ah that are flat and located in between these innermost semi-cylindrical portions 321ar (see FIGS. 16 to 19).

An innermost facing collector portion 321m1a refers to a part of the facing collector portion 321m1 included in the innermost portion 321a of the positive electrode plate 321. An innermost semi-cylindrical facing collector portion 321m1ar refers to a part of the facing collector portion 321m1 included in the innermost semi-cylindrical portion 321ar of the positive electrode plate 321, and an innermost flat facing collector portion 321m1ah refers to a part included in the innermost flat portion 321ah of the positive electrode plate 321.

This positive electrode plate 321 includes a collector cover layer 325 made of a polyimide tape having electrical insulation properties and heat resistance with a melting point of 350° C. or more. This cover layer 325 covers the entire innermost facing collector portion 321m1a of the facing collector portion 321m1. Namely, this cover layer 325 covers not only the innermost semi-cylindrical facing collector portions 321m1ar but also the innermost flat facing collector portions 321m1ah. The collector cover layer 325 is arranged to snugly fit in between the positive electrode collector foil 122 and the separator 141 over the entire innermost facing collector portion 321m1a in the flat wound electrode body 320 configuration, so that there is no gap between the positive electrode collector foil 122 over the entire innermost facing collector portion 321m1a and the separator 141.

Therefore, even if the positive electrode active material layer 123 peels off of the positive electrode collector foil 122 somewhere in the innermost portion 321a of the positive electrode plate 321, the peeled fragments of the positive electrode active material layer 123 can be prevented from moving from one side SA in the axis line AX direction of the flat wound electrode body 320 to various parts thereof through space between the positive electrode collector portion 321m and the separator 141. Accordingly, in this lithium ion secondary battery 300, a short circuit in the electrode body 320 resulting from peeled fragments of the positive electrode active material layer 123 can be prevented.

Even if the flat wound electrode body 320 should become hot due to the heat generated for example in the last stage of overcharge, and a portion of the separator 141 facing the innermost facing collector portion 321m1a particularly prone to become hot should undergo large heat shrinkage in the axis line AX direction, the collector cover layer 325 interposed between the innermost facing collector portion 321m1a and the negative electrode portion 131w prevents contact and a short circuit between the positive electrode collector portion 321m (entire innermost facing collector portion 321m1a) and the negative electrode portion 131w.

In Embodiment 3, in particular, since the thickness Tsm of the collector cover layer 325 is made larger than or equal to the thickness Tsw of the positive electrode active material layer 123, the separator 141 is retained between the cover layer 325 and the negative electrode portion 131w of the negative electrode plate 131. Therefore, even when the flat wound electrode body 320 becomes hot, the separator 141 can hardly undergo heat shrinkage in this portion. Thus contact and a short circuit between the positive electrode collector portion 321m (entire innermost facing collector portion 321m1a) and the negative electrode portion 131w can be prevented more reliably. Other parts similar to Embodiment 1 or 2 provide the similar effects as those of Embodiment 1 or 2.

Embodiment 4

Figure 20:
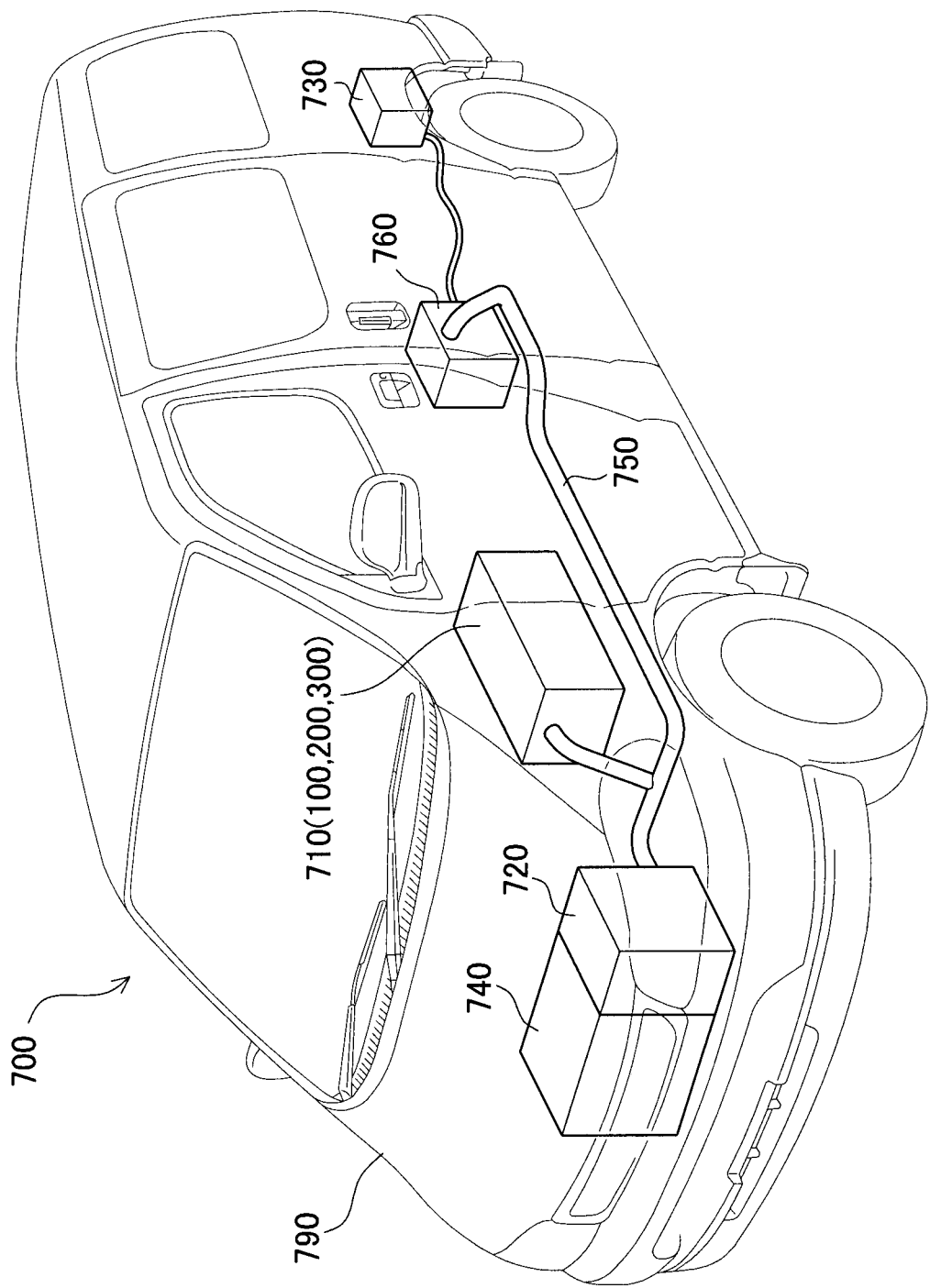
FIG. 20 is an explanatory view of a vehicle in Embodiment 4.

Next, a fourth embodiment will be described. A vehicle 700 according to Embodiment 4 has a plurality of lithium ion secondary batteries 100 of Embodiment 1 mounted thereon. It is a hybrid vehicle driven using a combination of an engine 740, a front motor 720, and a rear motor 730 as shown in FIG. 20.

More specifically, this vehicle 700 includes a vehicle body 790, the engine 740, and the front motor 720, the rear motor 730, a cable 750, and an inverter 760 attached to the engine 740. This vehicle 700 further includes a battery pack 710 containing a plurality of lithium ion secondary batteries 100 therein and uses the electrical energy stored in this battery pack 710 for driving the front motor 720 and the rear motor 730.

As described above, in the lithium ion secondary battery 100, a short circuit in the flat wound electrode body 120 resulting from fragments of the positive electrode active material layer 123 peeled off of the positive electrode collector foil 122 in the innermost semi-cylindrical portions 121ar of the positive electrode plate 121 is prevented, as well as contact and a short circuit between the positive electrode collector portion 121m (innermost semi-cylindrical facing collector portion 121m1ar) of the positive electrode plate 121 and the negative electrode portion 131w of the negative electrode plate 131 are prevented. Therefore, the vehicle 700 having this lithium ion secondary battery 100 mounted thereon can have higher reliability.

The lithium ion secondary battery 200 or 300 of Embodiment 2 or 3 may be mounted instead of the lithium ion secondary battery 100 of Embodiment 1.

Embodiment 5

Figure 21:
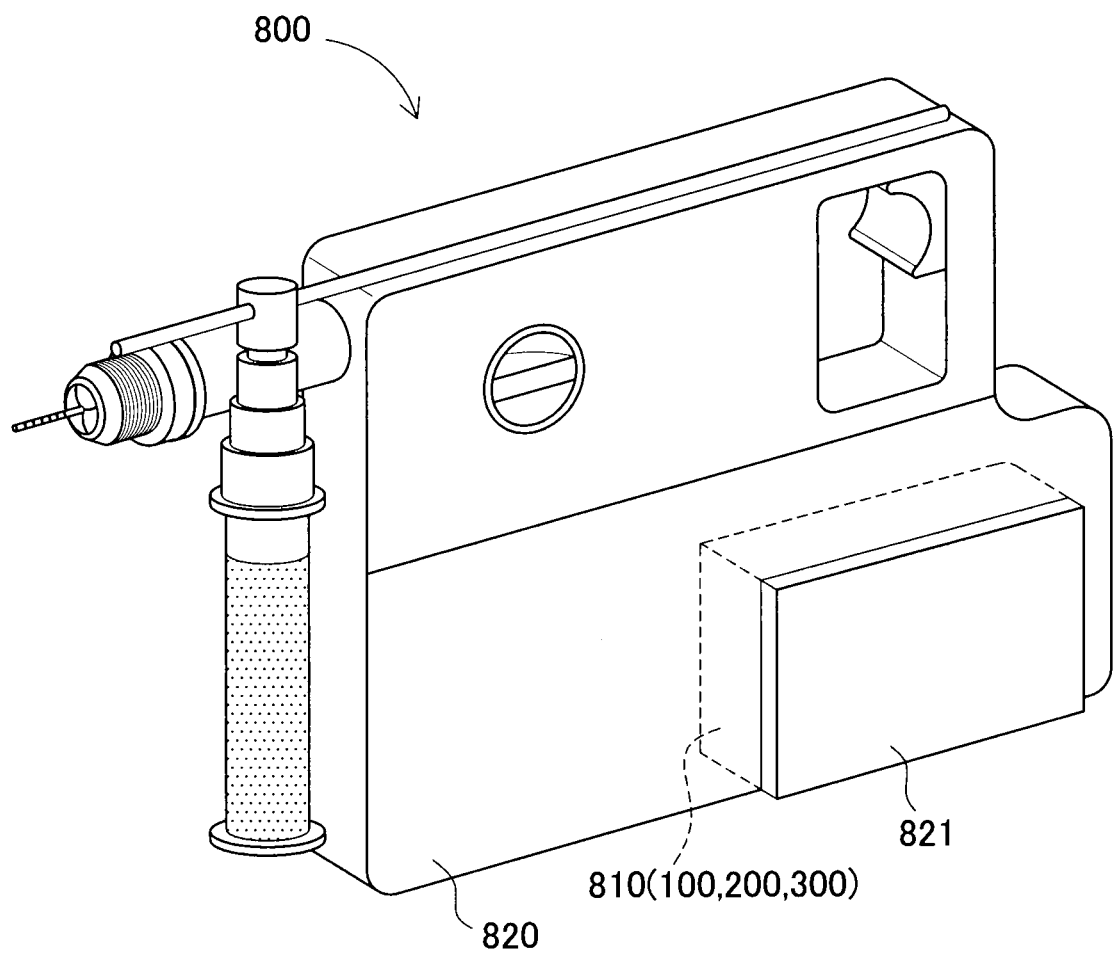
FIG. 21 is an explanatory view of a hammer drill in Embodiment 5.

Next, a fifth embodiment will be described. A hammer drill 800 of Embodiment 5 is a battery powered equipment having a battery pack 810 containing the lithium ion secondary batteries 100 of Embodiment 1 mounted thereon, as shown in FIG. 21. More specifically, this hammer drill 800 has the battery pack 810 accommodated in a bottom part 821 of a main body 820, using this battery pack 810 as the energy source for driving the drill.

As described above, in the lithium ion secondary battery 100, a short circuit in the flat wound electrode body 120 resulting from fragments of the positive electrode active material layer 123 peeled off of the positive electrode collector foil 122 in the innermost semi-cylindrical portions 121ar of the positive electrode plate 121 is prevented, as well as contact and a short circuit between the positive electrode collector portion 121m (innermost semi-cylindrical facing collector portion 121m1ar) of the positive electrode plate 121 and the negative electrode portion 131w of the negative electrode plate 131 are prevented. Therefore, the hammer drill 800 having this lithium ion secondary battery 100 mounted thereon can have higher reliability.

The lithium ion secondary battery 200 or 300 of Embodiment 2 or 3 may be mounted instead of the lithium ion secondary battery 100 of Embodiment 1.

The present invention has been described above with respect to Embodiments 1 to 5. However, it will be appreciated that the present invention is not limited to the above-described Embodiments 1 to 5, but may be applied with various changes made thereto without departing from the scope of its subject matter.

For example, while the material of the tape forming the collector cover layers 125, 225, and 325 is polyimide in Embodiments 1 to 5, the tape material may be changed as required. For example, tapes made of polypropylene (PP) or polyphenylene sulfide (PPS) may be used. While the collector cover layers 125, 225, and 325 are formed by affixing a tape in Embodiments 1 to 5, the method of forming the collector cover layers 125, 225, and 325 is not limited to this. For example, they may be formed by applying and drying an insulating paste containing an insulating material such as resin or ceramic such as alumina.

In Embodiments 1 to 5, the collector cover layers 125, 225, and 325 are formed in the innermost facing collector portions 121m1a, 221m1a, and 321m1a located innermost of the facing collector portions 121m1, 221m1, and 321m1. However, the collector cover layers 125 and others may be formed also to second turn or third turn portions counted from inside of the facing collector portions 121m1 and others, in addition to the innermost facing collector portions 121m1a and others. In consideration of the increase in battery weight with the formation of the collector cover layers 125 and others and permeability of electrolyte into the flat wound electrode body 120 and others during manufacture of the battery, it is particularly preferable to form the collector cover layers 125 and others in a portion within 3 turns of winding counted from inside of the positive electrode plate 121 and others.

While the thickness Tsm (=35 μm) of the collector cover layers 125, 225, and 325 is made equal to the thickness Tsw (=35 μm) of the positive electrode active material layer 123 in Embodiments 1 to 5, the thickness Tsm of the collector cover layers 125 and others may be made larger than the thickness Tsw of the positive electrode active material layer 123 (specifically, the thickness Tsm may be 55 μm or 60 μm). In this case, too, the interposed collector cover layers 125 and others can fill up the gap between the innermost semi-cylindrical facing collector portions 121m1ar and others (positive electrode collector foil 122) and the separator 141. Therefore, even if the positive electrode active material layer 123 peels off of the positive electrode collector foil 122 in the innermost semi-cylindrical portions 121ar and others of the positive electrode plate 121 and others, the peeled fragments of the positive electrode active material layer 123 can be reliably prevented from moving from one side SA in the axis line AX direction of the flat wound electrode body 120 and others to various parts thereof through space between the positive electrode collector portion 121m and others and the separator 141.

The invention claimed is:

1. Nonaqueous electrolyte secondary battery including:
a flat wound electrode body having:
an elongated positive electrode plate with a positive electrode active material layer formed in part of an elongated positive electrode collector foil, the positive electrode plate having a longitudinally extending strip-shaped positive electrode portion where the positive electrode active material layer is present in a thickness direction thereof and a longitudinally extending strip-shaped positive electrode collector portion located at one end in a width direction of the positive electrode plate where the positive electrode active material layer is not present in the thickness direction thereof;
an elongated negative electrode plate with a negative electrode active material layer formed in part of an elongated negative electrode collector foil, the negative electrode plate having a longitudinally extending strip-shaped negative electrode portion where the negative electrode active material layer is present in a thickness direction thereof and a longitudinally extending strip-shaped negative electrode collector portion located at one end in a width direction of the negative electrode plate where the negative electrode active material layer is not present in the thickness direction thereof; and
an elongated separator,
the positive electrode plate and the negative electrode plate being overlapped upon one another via the separator and wound around an axis line into a flat shape, wherein
the positive electrode collector portion of the positive electrode plate includes, in the flat wound electrode body configuration, a facing collector portion adjacent to one side in a direction along the axis line of the positive electrode portion and facing the negative electrode portion of the negative electrode plate, and
the positive electrode plate includes a collector cover layer having electrical insulation properties and covering only a portion in the longitudinal direction of the positive electrode collector portion, the collector cover layer covering at least an innermost semi-cylindrical facing collector portion located innermost of the facing collector portion and bent into a semi-cylindrical shape.

2. The nonaqueous electrolyte secondary battery according to claim 1, wherein
the collector cover layer is formed at a location only within N/2 turns counted from inside of the flat wound electrode body where N is the number of turns of winding of the positive electrode plate in the flat wound electrode body.

3. The nonaqueous electrolyte secondary battery according to claim 1, wherein
the collector cover layer has a thickness larger than or equal to that of the positive electrode active material layer.

4. A vehicle having the nonaqueous electrolyte secondary battery according to claim 1 mounted thereon and using the electrical energy stored in the nonaqueous electrolyte secondary battery as part or all of the driving energy of the driving source.

5. A battery powered equipment having the nonaqueous electrolyte secondary battery according to claim 1 mounted thereon and using the nonaqueous electrolyte secondary battery as at least one of the energy sources.

6. The nonaqueous electrolyte secondary battery according to claim 2, wherein
the collector cover layer has a thickness larger than or equal to that of the positive electrode active material layer.

7. A vehicle having the nonaqueous electrolyte secondary battery according to claim 2 mounted thereon and using the electrical energy stored in the nonaqueous electrolyte secondary battery as part or all of the driving energy of the driving source.

8. A vehicle having the nonaqueous electrolyte secondary battery according to claim 3 mounted thereon and using the electrical energy stored in the nonaqueous electrolyte secondary battery as part or all of the driving energy of the driving source.

9. A battery powered equipment having the nonaqueous electrolyte secondary battery according to claim 2 mounted thereon and using the nonaqueous electrolyte secondary battery as at least one of the energy sources.

10. A battery powered equipment having the nonaqueous electrolyte secondary battery according to claim 3 mounted thereon and using the nonaqueous electrolyte secondary battery as at least one of the energy sources.

* * * * *